(12) United States Patent
Takeda et al.

(10) Patent No.: US 7,357,368 B2
(45) Date of Patent: Apr. 15, 2008

(54) COMBINED VALVE

(75) Inventors: Hideyuki Takeda, Komaki (JP); Takahisa Toho, Komaki (JP); Yasushi Hirako, Komaki (JP)

(73) Assignee: CKD Corporation, Komaki (JP)

( * ) Notice: Subject to any disclaimer, the term of this patent is extended or adjusted under 35 U.S.C. 154(b) by 50 days.

(21) Appl. No.: 11/378,541

(22) Filed: Mar. 20, 2006

(65) Prior Publication Data

US 2006/0145106 A1 Jul. 6, 2006

Related U.S. Application Data

(63) Continuation of application No. PCT/JP2004/015058, filed on Oct. 13, 2004.

(30) Foreign Application Priority Data

Oct. 16, 2003 (JP) ............... 2003-356416

(51) Int. Cl.
*F16K 35/00* (2006.01)

(52) U.S. Cl. ............... 251/93; 251/60; 251/331

(58) Field of Classification Search ............... 251/60, 251/63.5, 90, 92, 93, 331; 137/383
See application file for complete search history.

(56) References Cited

U.S. PATENT DOCUMENTS 1,634,672 A * 7/1927 Mallory ............... 137/383

3,012,751 A * 12/1961 Hauser ............... 251/60
3,737,140 A * 6/1973 Toth ............... 251/14
4,485,846 A * 12/1984 Neff ............... 137/625.64
4,706,929 A * 11/1987 Kalaskie et al. ............... 251/14
4,968,003 A * 11/1990 Danko ............... 251/285

FOREIGN PATENT DOCUMENTS

| JP | U-03-041278 | 4/1991 |
| JP | U-07-001381 | 1/1995 |
| JP | Y2-2551213 | 6/1997 |
| JP | B2-2719506 | 11/1997 |
| JP | A-11-051226 | 2/1999 |
| JP | A-11-051239 | 2/1999 |
| JP | A-11-311365 | 11/1999 |
| JP | A-2001-263507 | 9/2001 |

* cited by examiner

*Primary Examiner*—John K. Fristoe, Jr.
(74) *Attorney, Agent, or Firm*—Oliff & Berridge, PLC

(57) ABSTRACT

A combined valve is constructed by integrating a manual valve operating as a safety mechanism and a pilot valve. When a handle of a knob of the manual valve is in a safety mechanism release position, a valve mechanism can be opened and closed depending on whether or not there is air supply to an operation port. When the handle is in the safety mechanism release position and the valve mechanism is even in a valve open state, the valve mechanism can be forcibly brought to a valve closed state by rotating the handle to a safety mechanism set position. Further, when the handle is in the safety mechanism set position, the valve mechanism can always be kept in the valve closed state irrespective of air supply to the operation port.

8 Claims, 30 Drawing Sheets

COMBINED VALVE

CROSS-REFERENCE TO RELATED APPLICATIONS

This application is a continuation application based upon and claims the benefit of the prior PCT International Patent Application No. PCT/JP2004/015058 filed on Oct. 13, 2004, the entire contents of which are incorporated herein by reference.

BACKGROUND OF THE INVENTION

Field of the Invention

The present invention relates to a combined valve for controlling the flow of fluid, integrally including a manual valve to be operated as a safety device and a pilot valve.

BACKGROUND ART

Description of Related Art

In conventional facilities having piping for flowing various kinds of gasses or the like, typically in a semiconductor manufacturing process, a safety device is required to prevent gas leakage resulting from malfunction of a pilot valve during various works needing demounting of the piping. As such conventional technique, Japanese unexamined patent application publication No. 11(1999)-51226 is explained below with reference to FIG. 14.

FIG. 14 shows a structure of a process gas unit 200 in a first prior art to be used in a semiconductor manufacturing process. The process gas unit 200 includes a manual valve 201, input air-operated valve 205, mass flow controller 208, output air-operated valve 210, manual valve 211, and others, which are connected in series. In this unit, process gas flows in along a left arrow GI and out along a right arrow GO toward a vacuum chamber or the like (not shown).

During normal use, the manual valves 201 and 211 are held in a valve opening position, and the input air-operated valve 205 and the output air-operated valve 210 are operated by remote control to open and close for supply and stop of the process gas.

During repair or maintenance of the process gas unit 200 by for example demounting of the mass flow controller 208, the manual valves 201 and 211 are held in a valve closed state to stop gas supply regardless of the open/closed state of the air-operated valves 205 and 210. Accordingly, gas supply can be started/stopped as needed while the manual valves 201 and 211 are open, whereas gas supply can surely be stopped while the manual valves 201 and 211 are closed.

In case of emergency, even in supplying gas, gas supply can be stopped when the manual valves 201 and 211 are switched from the opening position to the closing position. In this piping arrangement that the manual valves and the air-operated valves are connected in series, the manual valves 201 and 211 serve as a safety device.

For the semiconductor manufacturing line, the reduction in size and cost of devices has always been further demanded. Hence, it is conceivable that a manual valve and an air-operated valve are integrally arranged in one unit, forming a combined valve, as a measure of saving space of a process gas unit. Such combined valve is disclosed in for example Japanese unexamined patent application publication No. 2003-130249 relating to an air-operated valve combined with a manual operating lever valve into one unit.

As one example of the air-operated valve with operating lever valve, a second prior art disclosed in the publication '249 is explained below.

FIG. 15 shows the air-operated valve with operating lever valve in the second prior art. This valve is arranged to control the flow of fluid by driving a valve element by means of a driving device provided in a valve casing and to inhibit the flow of fluid with the operating lever attached to the valve casing regardless of operation of the driving device.

The structure shown in FIG. 15 is described below. A main operation valve 101 includes a valve casing 103 provided therein with a flow passage 102 formed between an inlet and an outlet for process liquid. A valve seat 104 is formed near the center of the flow passage 102. A valve element 105 is connected to an end of a valve rod 106. The valve casing 103 is also provided with a holding part 107 in which the valve rod 106 is held movably toward and away from the valve seat 104. This holding part 107 contains a piston 108 that is connected to the other end of the valve rod 106 and slidable within the holding part 107. The piston 108 is normally urged by a compression coil spring 109 to bring the valve element 105 into contact with the valve seat 104. When an electromagnetic valve not shown is activated, the piston 108 is caused to slide in a cylinder 116 by air pressure supplied through a through hole 115 against the urging force of the coil spring 109. A pin-shaped pressing member 110 is urged by an extension spring not shown in an opposite direction to the piston 108. The pressing member 110 has a round base end 110a. An operating lever 111 is disposed in contact with the base end 110a of the pressing member 110. This lever 111 is provided with a handle 113 at one end and a contact end 114 abutting against the base end 110a at the other end with respect to an eccentric shaft 112.

When the handle 113 of the operating lever 111 is rotated up (in a direction indicated by an arrow A in FIG. 15), the contact end 114 is rotated about the eccentric shaft 112, pushing the pressing member 110 toward the piston 108 to bring the valve element 105 into contact with the valve seat 104. In other words, the operating lever 111 may be switched between a first position for forcibly bringing the valve element 105 into contact with the valve seat 104 and a second position for bringing the valve element 105 out of contact with the valve seat 104. As above, the valve element 105 is driven by the holding part 107 provided in the valve casing 103 to control the flow of process liquid and the pressing member 110 and the operating lever 111 provided in the valve casing 103 are operated to forcibly inhibit the flow of fluid regardless of the operating condition of the holding part 107.

The above conventional techniques involve the following problems.

(1) In the first prior art, according to the piping arrangement in FIG. 14, the manual valves 201 and 211 function as a safety device. However, two types of valves, namely, the air-operated valves 205 and 210 and the manual valves 201 and 211 are needed, so that space for mounting the valves could not be saved.

(2) The second prior art has the following disadvantages.

As the action of toggle, it is possible to readily control the flow condition of process liquid by a toggle from the outside of the device. In the second prior art shown in FIG. 15, the operating lever 111 is adopted as the toggle and the air-operated valve with the operating lever valve is arranged.

This arrangement may achieve an integral unit of the operating lever valve and the air-operated valve; however, this unit only could be closed manually and has no function to fixedly hold the operating lever 111 at a predetermined position. Thus, the valve closed state could not be ensured and it has no function as the safety device.

In other words, the second prior art is merely arranged to manually perform temporal valve-closing. In case the piping is demounted for maintenance or the like, therefore, liquid may leak out due to malfunction of the air-operated valve.

In the above publication '249, it is disclosed that "this can combine two functions of a conventional toggle valve (13) and a safety valve (17), thus achieving a main operation valve (21) with reduced space for mounting". However, this device has no function to reliably maintain the valve closed state and does not function as an original safety valve.

(3) In case of a chemical liquid valve, chemical liquid to be used in the semiconductor manufacturing process is allowed to flow through the valve. Accordingly, a valve element has to be made of fluorocarbon resin having resistance to corrosion. The fluorocarbon resin is likely to creep. A long-term normal use as a pilot valve may therefore lead to plastic deformation of the valve seat, which shrinks in a loading direction.

As such plastic deformation progresses, a sealing strength between the valve element and the valve seat will be decreased, causing leakage.

(4) There is no mechanism to fixedly hold the operating lever 111 at the predetermined valve-opening position. Thus, the valve closed state could not be ensured and there is no function to maintain normal use as the pilot valve. Specifically, the second prior art is merely arranged to manually perform valve-opening. For example, when the piston 108 makes contact with a stopper (not shown) restricting a piston stroke, vibration is transmitted to the operating lever 111, which may shift to the valve-closing position. Consequently, the pilot valve is closed irrespective of the intension of an operator, thus stopping the flow of liquid.

(5) Further, when the operating lever 111 is to be operated to forcibly bring the valve element 105 into contact with the valve seat 104 if the cylinder 116 is supplied with air through the through hole 115, a larger force than the air pressure on the piston 108 in the cylinder 116 is required to operate the operating lever 111.

SUMMARY OF THE INVENTION

The present invention has been made to solve the above problems and has a purpose to provide a combined valve integrally including a manual valve to be operated as a safety mechanism and a pilot valve.

To be more concrete, to solve the above problems (1) to (3) of the prior arts mentioned above, an object of the present invention is to provide a combined valve which may be used as a chemical liquid valve arranged such that a pilot valve is allowed to open/close only when a manual valve operating as a safety mechanism is in a release position, the manual valve is switched to a valve closing position to shut off the flow of fluid even where the pilot valve is open, and the manual valve can be held in such position.

To solve the above problem (4), another object of the present invention is to provide a combined valve allowing continuous normal use as a pilot valve by a mechanism for holding a manual valve in a valve opening position.

To solve the above problem (5), further, another object of the present invention is to provide a combined valve including a manual valve easy for an operator to operate without applying large force.

To achieve the above purpose, there is provided a combined valve comprising: a valve mechanism including a diaphragm valve element and a valve seat with which the diaphragm valve element is brought into and out of contact to control a flow of fluid; a pilot mechanism including an urging device that presses the diaphragm valve element against the valve seat, the pilot mechanism being operated to bring the diaphragm valve element out of contact with the valve seat by air pressure; and a manual mechanism arranged to act on operations of the pilot mechanism; wherein when the manual mechanism is operated to interrupt a supply passage of air to the pilot valve, the diaphragm valve element is axially moved from a valve open position to a valve closed position by means of the urging device, and the combined valve further comprises a manual-mechanism holding device for holding the manual mechanism in a predetermined position to hold the diaphragm valve element in the valve closed position.

Accordingly, even in case of emergency where the valve operating mechanism has to be switched from a valve open state allowing air supply to a pilot mechanism to a valve closed state, an operator may react appropriately with the manual operating mechanism.

Further, irrespective of air supply to the pilot mechanism, the valve operating mechanism is switched to the valve closed state by the manual operating mechanism. Even in the case where the air supply to the pilot mechanism is erroneously caused during maintenance, for example, the valve operating mechanism will not be switched to the valve open state. Accordingly, the operator may perform the maintenance work safely.

According to another aspect of the present invention, there is provided a combined valve comprising: a valve mechanism including a diaphragm valve element and a valve seat with which the diaphragm valve element is brought into and out of contact to control a flow of fluid; a pilot mechanism including and an urging device that presses the diaphragm valve element against the valve seat, the pilot mechanism being operated to bring the diaphragm valve element out of contact with the valve seat by air pressure; and a manual mechanism arranged to act on operations of the pilot mechanism; wherein the manual mechanism is operated to axially move the diaphragm valve element from a valve open position to a valve closed position, and the manual mechanism is directly provided with a first manual-mechanism holding device for holding the diaphragm valve element in the valve closed position.

According to the present invention, as described above, valve mounting space can be saved and further the pilot valve is allowed to open/close only when the manual valve is in a release state. Even where the pilot valve is in the open state, the flow of fluid can be stopped by switching the manual valve to a valve-closing position and the manual valve can be held in such position. Thus the manual valve has a function as a safety device and also can function as a safety valve.

DETAILED DESCRIPTION OF THE PREFERRED EMBODIMENTS

A detailed description of preferred embodiments of a combined valve embodying the present invention will now be given referring to FIGS. 1 to 13 and 16 to 32.

First Embodiment

A combined valve 1 in a first embodiment will be described with reference to FIGS. 1 to 6.

Figure 1:
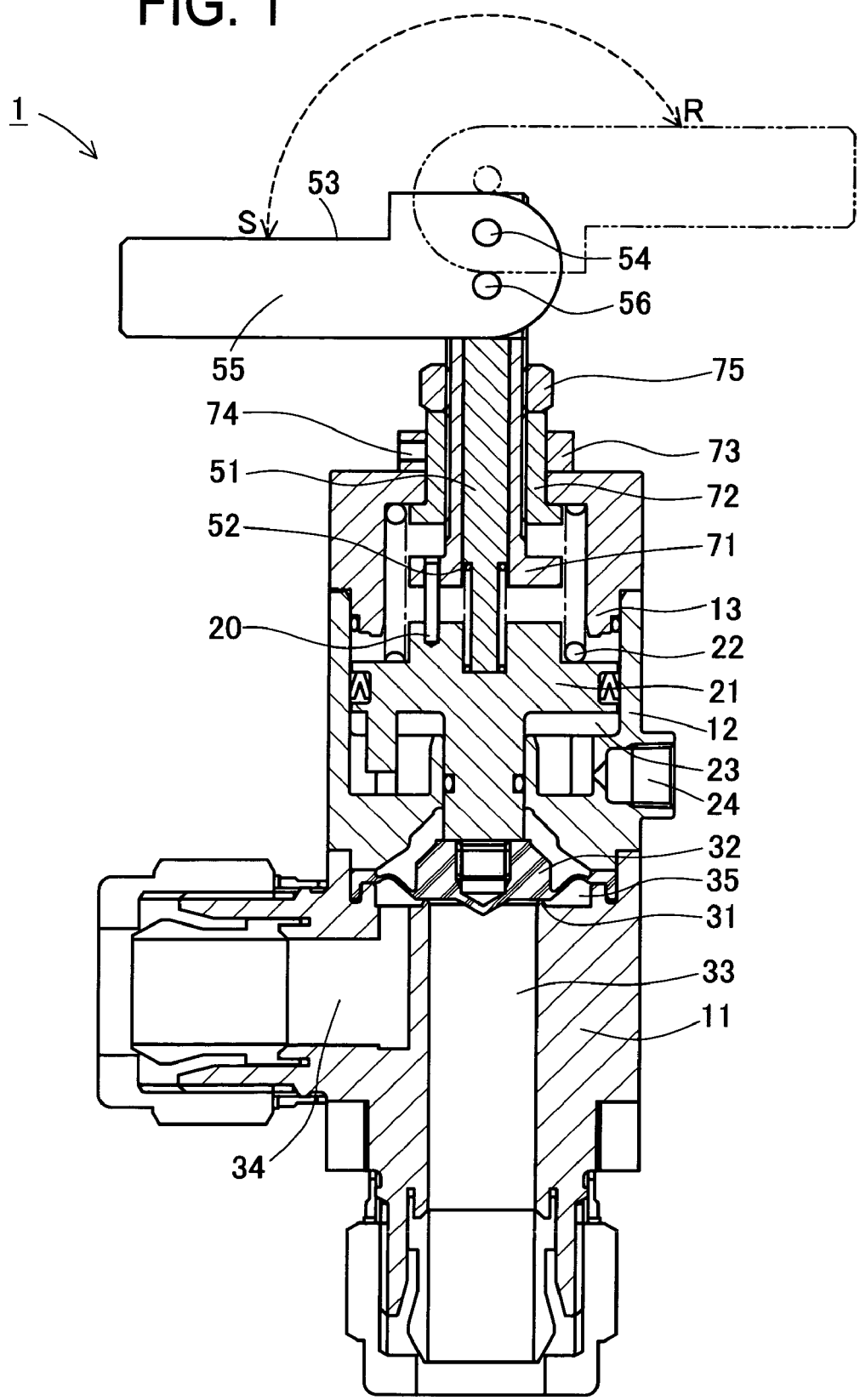
FIG. 1 is a sectional view of a combined valve held in a valve closed state by a manual operating mechanism in a first preferred embodiment.
Figure 2:
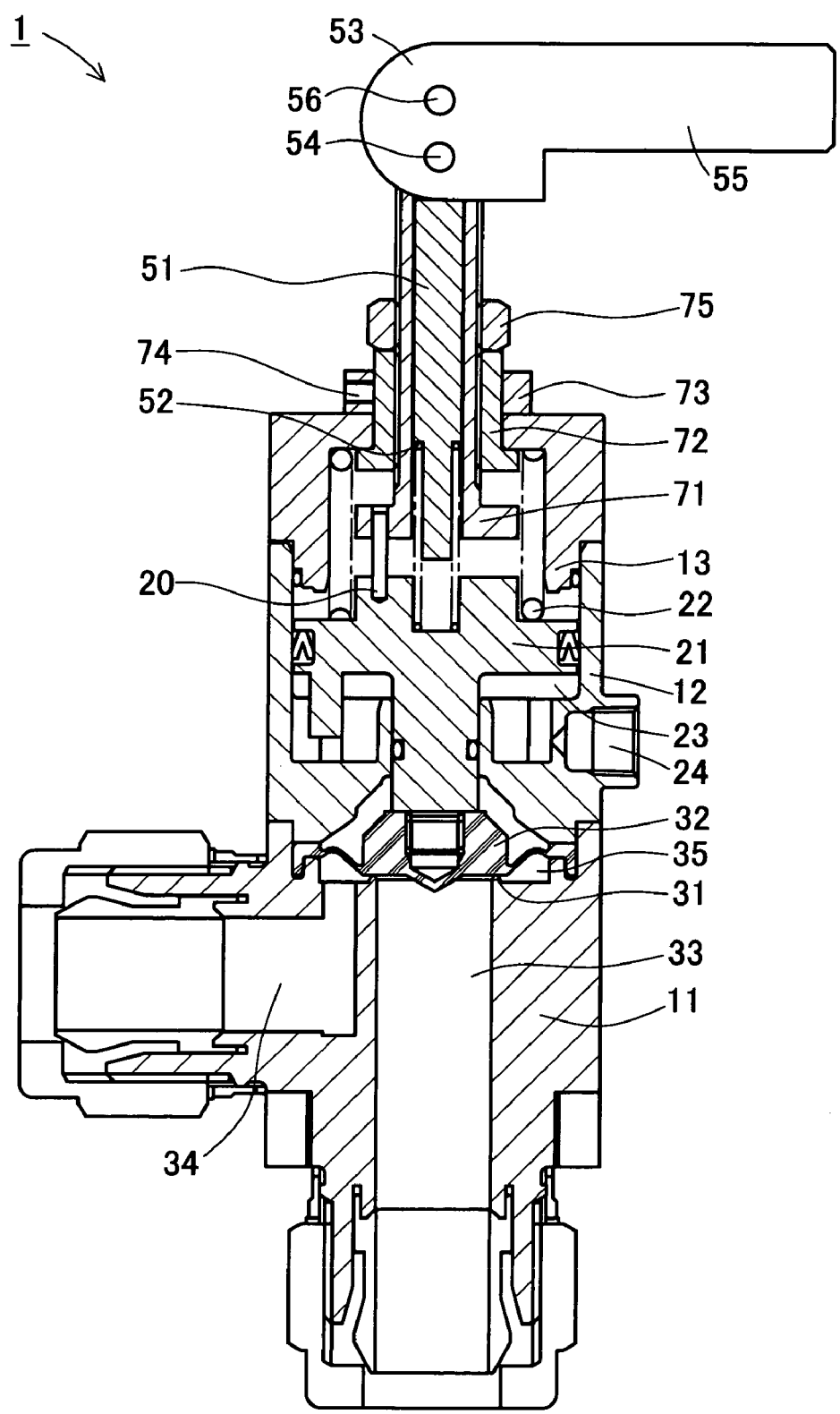
FIG. 2 is a sectional view of the combined valve in a valve closed state.
Figure 3:
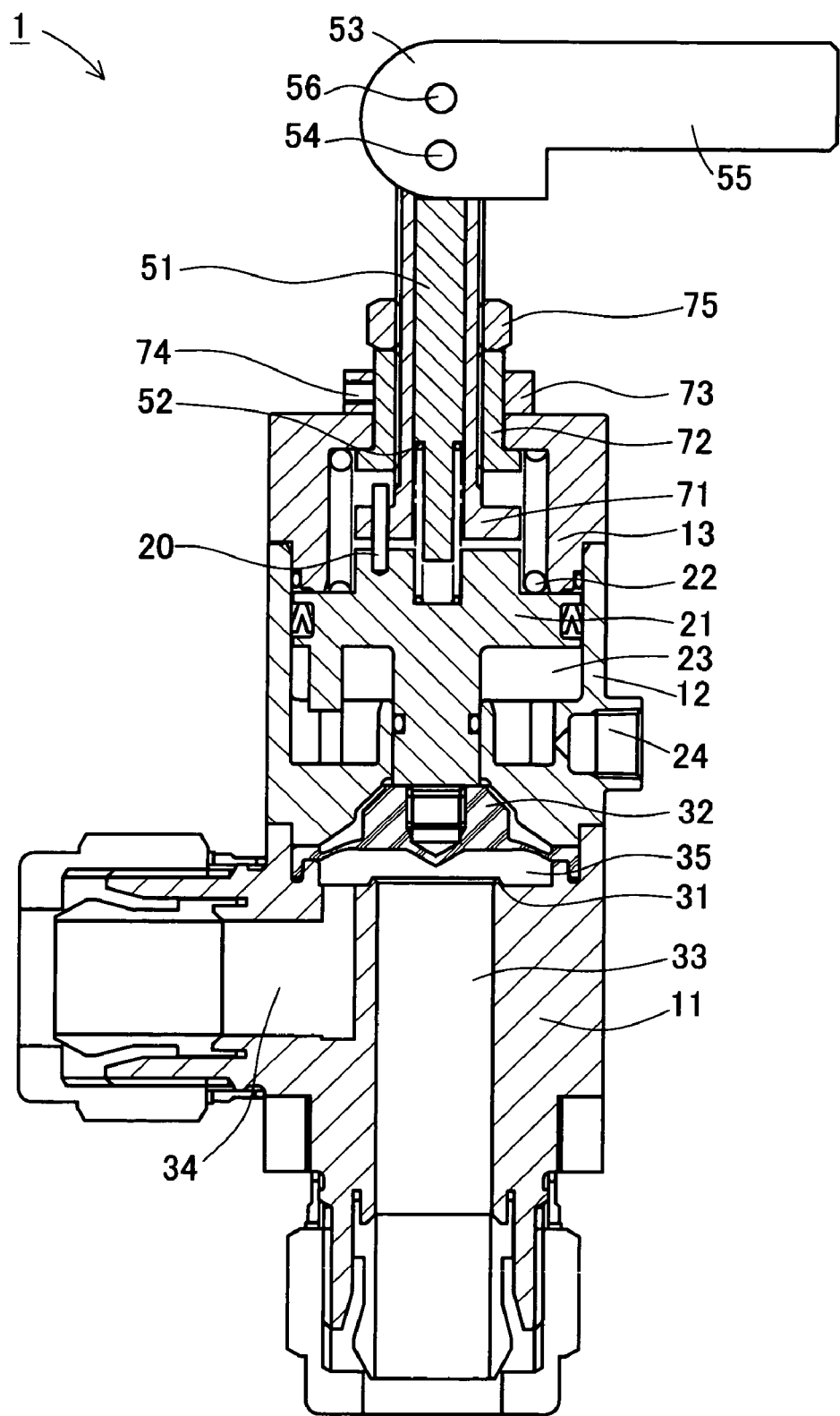
FIG. 3 is a sectional view of the combined valve in the valve open state.
Figure 4:
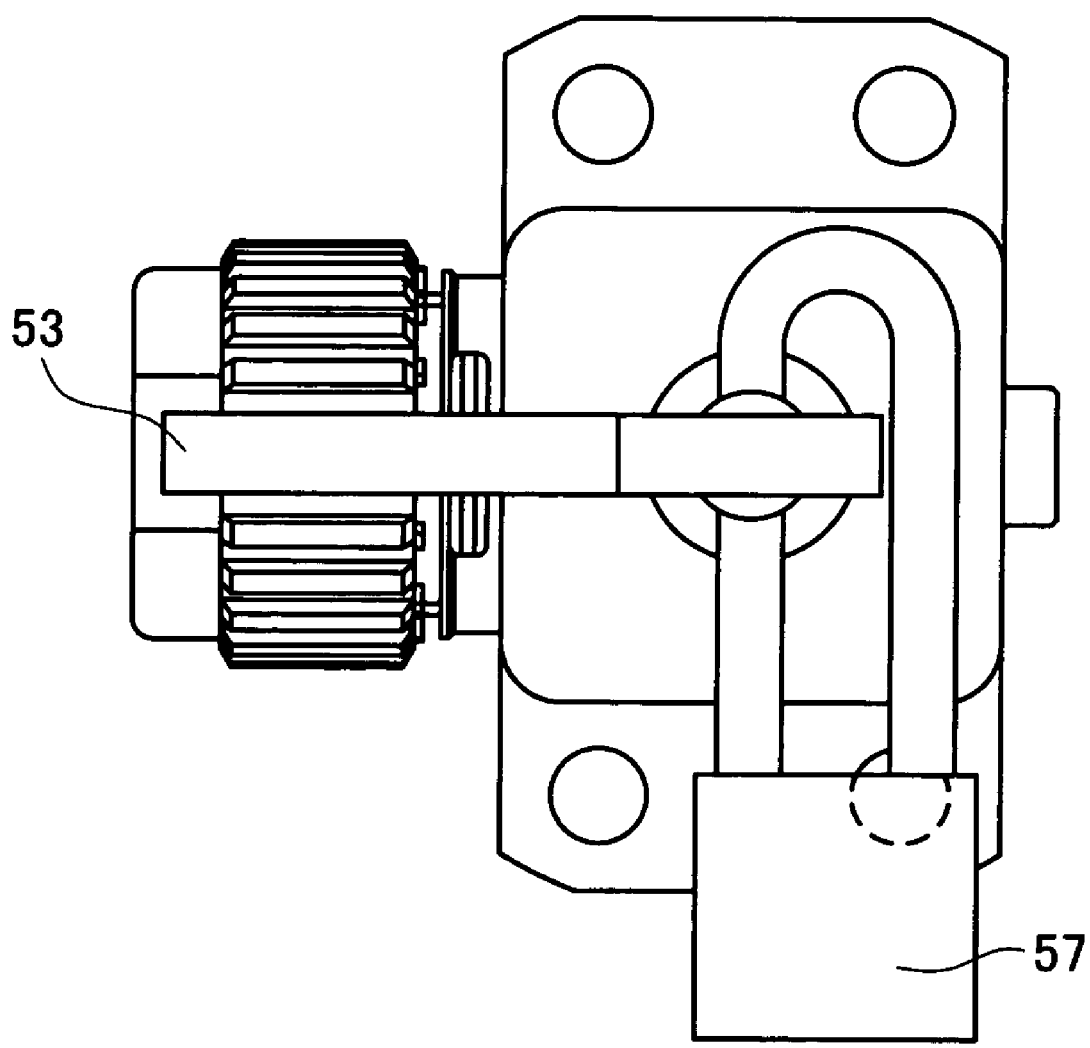
FIG. 4 is a partial view of the combined valve held in the valve closed state by the manual operating mechanism locked with a padlock.

FIGS. 1 to 3 are sectional views of the combined valve 1 in the first embodiment of the present invention. As shown in FIG. 3, a body section of the combined valve 1 integrally includes a valve body 11, cylinder 12, and cover 13. The combined valve 1 is structured of a pilot valve, a manual valve, and a valve-seat following mechanism. As for the combined valve 1, "Upper" indicates a manual valve side and "Lower" indicates a pilot valve side.

Firstly, the pilot valve of the combined valve 1 is explained. The pilot valve is further divided into a pilot mechanism and a valve operating mechanism. Here, the pilot mechanism includes the cylinder 12, the cover 13, a piston rod 21, a spring 22, and a spring 52. These cylinder 12 and cover 13 constitute an airtight container, in which the piston rod 21 is slidably mounted. This piston rod 21 partitions the space defined by the cylinder 12 and the cover 13 into two chambers, upper and lower. The lower chamber is a pressure chamber 23. This pressure chamber 23 is communicated with an operation port 24. On the piston rod 21, the springs 22 and 52 which urge the piston rod 21 downwards are mounted.

The valve operating mechanism includes the valve body 11, a valve seat 31, a diaphragm valve element 32, and ports 33 and 34. In the valve body 11, the ports 33 and 34 are communicated with each other through the valve seat 31 and a communicating area 35. The diaphragm valve element 32 which will be brought into/out of contact with the valve seat 31 is partially sandwiched between the valve body 11 and the cylinder 12. Accordingly, the valve body 11 and the cylinder 12 are airtightly partitioned by the diaphragm valve element 32, preventing the fluid flowing in the communicating area 35 from leaking out to the cylinder 12 side. Slidably mounted in the cylinder 12 is the piston rod 21 coupled to the diaphragm valve element 32. The diaphragm valve element 32 is arranged to come apart from the valve seat 31 when the piston rod 21 is not urged downwards, but come into contact with the valve seat 31 when the diaphragm valve element 32 is pressed downwards by the piston rod 21.

The manual valve of the combined valve 1 is explained below. The manual valve includes a rod 51, a spring 52, and a knob 53. Above the rod 51, the knob 53 is attached to be rotatable about an eccentric shaft 54. The knob 53 is provided with a handle 55 and a keyhole 56.

The valve-seat following mechanism is described below. The valve-seat following mechanism includes a feed screw 71 formed with external threads, a holder 72 formed with internal threads which engage with the external threads of the feed screw 71, an adjusting knob 73, a setscrew 74, and a lock nut 75. The feed screw 71 is located in rotatable engagement with the holder 72 of the cover 13. A rotation-locking pin 20 is provided between the feed screw 71 and the piston rod 21. The lock nut 75 is placed on the holder 72. The adjusting knob 73 and the setscrew 74 are arranged on the outer periphery of the holder 72.

The combined valve 1 having the above structure is operated as follows.

A normal operation of the pilot valve will be described first. FIG. 3 shows the combined valve 1 with the manual valve held in a valve opening position and the pilot valve opened to allow the flow of fluid. FIG. 2 shows the combined valve 1 with the manual valve held in the valve opening position but the pilot valve closed to prevent the flow of fluid.

FIG. 3 is first explained. FIG. 3 shows the combined valve 1 with the pilot valve opened by supply of air pressure thereto by an electromagnetic valve not shown. Specifically, when air is supplied to the pressure chamber 23 through the operation port 24, the air pressure in the pressure chamber 23 is increased. Under upward pressure, the piston rod 21 slides upwards in the cylinder 12 against the downward urging force of the springs 22 and 52. In association with the upward sliding of the piston rod 21, the diaphragm valve element 32, which is not urged downwards, comes apart from the valve seat 31. Accordingly, a passage space is generated between the valve seat 31 and the diaphragm valve element 32, providing communication between the ports 33 and 34 through the communicating area 35. The fluid supplied through the port 33 is thus allowed to flow out through the port 34.

Next, FIG. 2 shows the combined valve 1 with the pilot valve brought into a closed state. Specifically, when air supply into the pressure chamber through the operation port 24 is stopped and the air pressure forcing the piston rod 21 upwards in the pressure chamber 23 is reduced, the piston rod 21 is pushed down by the urging force of the springs 22 and 52 mounted on the piton rod 21. Accordingly, the piston rod 21 is urged downwards, bringing the diaphragm valve element 32 into contact with the valve seat 31, thus closing the flow passage space between the valve seat 31 and the diaphragm valve element 32. This interrupts the communication between the port 33, the communicating area 35, and the port 34 and thus the fluid supplied through the port 33 is not allowed to flow out through the port 34.

When the manual valve is located in the valve opening position, opening/closing operation of the pilot valve can be performed by the electromagnetic valve.

An operation of the manual valve when used by an operator for example as a safety mechanism during maintenance or the like is explained referring to FIG. 1. FIG. 1 shows the combined valve 1 with the manual valve in the valve closing position, which is switched from the valve opening position shown in FIG. 2 or 3.

Firstly, explanation is made on the manual valve switched from the valve opening position shown in FIG. 3 to the valve closing position.

To be concrete, the operator rotates the handle 55 of the knob 53, 180 degrees counterclockwise in front view, about the eccentric shaft 54 from the valve opening position (hereinafter, referred to as a safety mechanism release position R) to a position (hereinafter, referred to as a safety mechanism set position S). Then, the rod 51 comes into contact with the piston rod 21 which also receives the downward urging force of the springs 22 and 52. The piston rod 21 is therefore urged downwards, bringing the diaphragm valve element 32 integral with the piston rod 21 into contact with the valve seat 31. As a result, the fluid flowing in the port 33 is prevented from passing through the communicating area 35 closed by the diaphragm valve element 32 and flowing toward the port 34.

Secondly, explanation is made on the manual valve switched from the valve opening position shown in FIG. 2 to the valve closing position.

To be concrete, the operator rotates the manual valve from the safety mechanism release position R to the safety mechanism set position S. Then, the rod 51 comes into contact with the piston rod 21 which also receives the downward urging force of the springs 22 and 52. The piston rod 21 is therefore urged downwards, holding the diaphragm valve element 32 integral with the piston rod 21 in contact with the valve seat 31. As a result, the fluid flowing in the port 33 is prevented from passing through the communicating area 35 closed by the diaphragm valve element 32 and flowing toward the port 34.

As above, when the manual valve is rotated from the valve opening position in FIGS. 2 and 3 to the valve closing position, the flow passage space between the diaphragm valve element 32 and the valve seat 31 is closed, thus interrupting the communication between the port 33, the communicating area 35, and the port 34. Consequently, the fluid flowing in the port 33 is prevented from flowing out through the port 34.

In other words, even where the pilot valve is in a valve open state as shown in FIG. 3, the operator may rotate the handle 55 from the safety mechanism release position R to the safety mechanism set position S to forcibly switch the pilot valve from the valve open state to the valve closed state. Accordingly, in case of emergency where fluid discharge should be stopped immediately, the operator can react to the emergency case appropriately.

Further, for example a padlock 57 may be inserted in the keyhole 56 of the knob 53 in the state of FIG. 1 by the operator. In this case, the handle 55 is prevented from rotating from the safety mechanism set position S (FIG. 4) even where air is supplied to the operation port 24. The rod 51 and the piston rod 21 are thus held in contact relation, so that the rod 21 will not slide upwards. Thus, the pilot valve can be maintained in the valve closed state even if air is supplied through the operation port 24.

In other words, when the operator locks the manual valve in the valve closing position, the fluid will not flow out even if air is supplied through the operation port 24 due to malfunction. The operator is therefore allowed to safely work for maintenance or the like.

Figure 5:
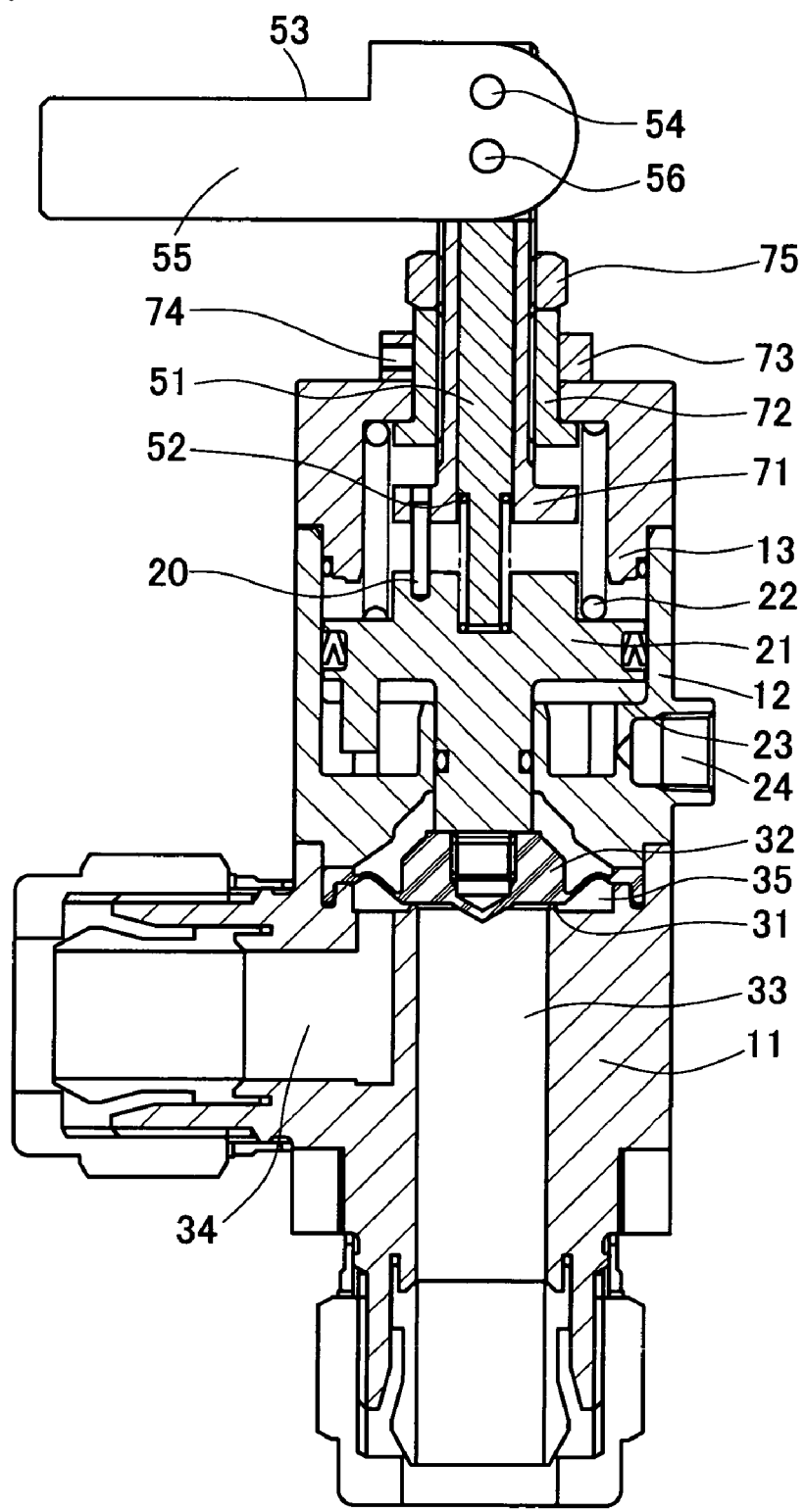
FIG. 5 is a sectional view of the combined valve used as a chemical liquid valve, showing a state of a valve seat plastic-deformed.
Figure 6:
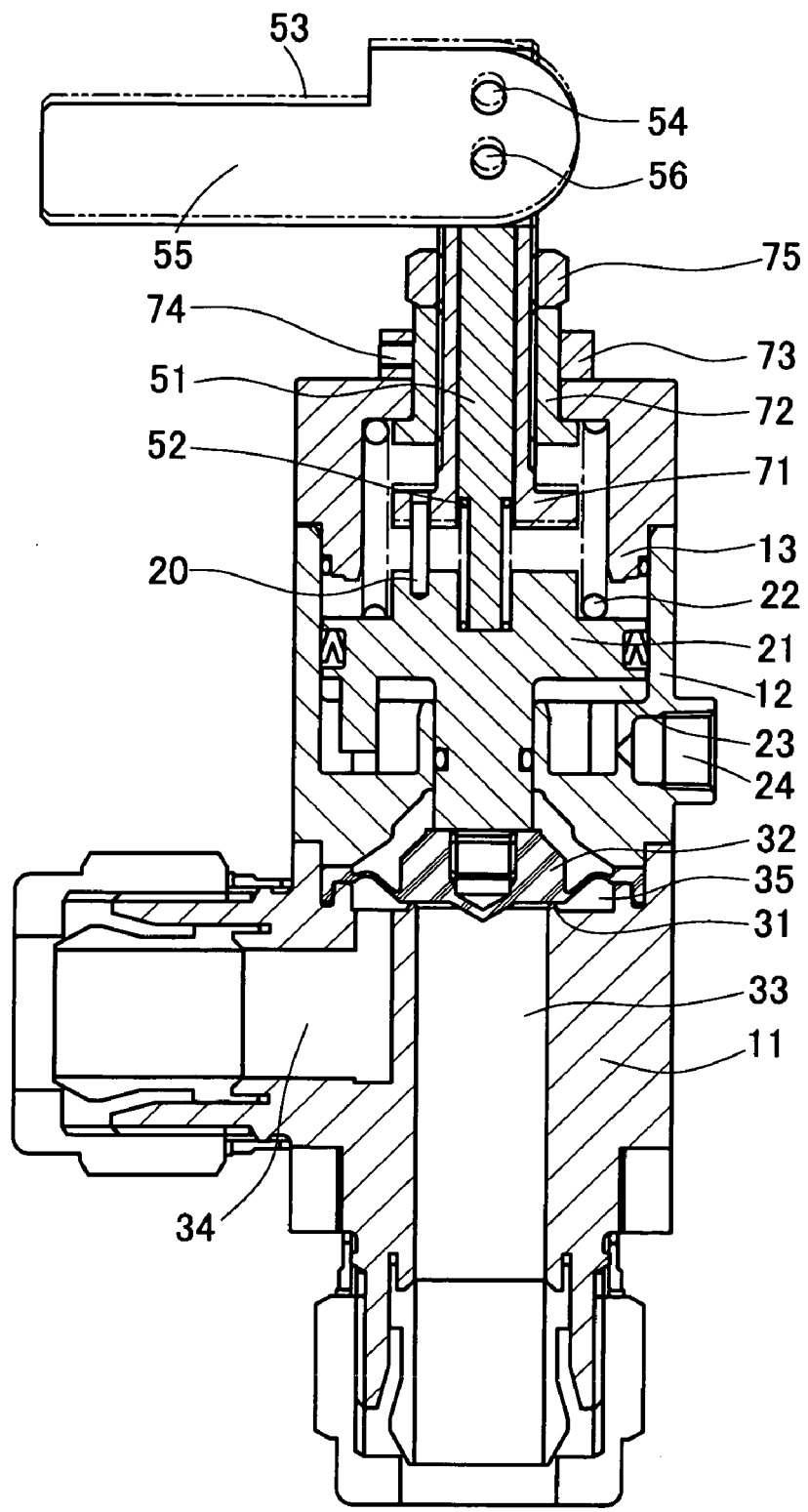
FIG. 6 is a sectional view of the combined valve operated to cause a diaphragm valve element to follow the valve seat plastic-deformed shown in FIG. 5.

Next, FIGS. 5 and 6 are explained. Here, FIGS. 5 and 6 are sectional views of the combined valve with the valve-seat following mechanism to prevent a decrease in the sealing strength of the valve operating mechanism when the combined valve 1 of the present invention is used as the chemical liquid valve.

For use of the combined valve 1 as the chemical liquid valve, it is assumed that the valve seat 31 is made of a material having resistance to corrosion, such as fluorocarbon resin. At this time, when the valve is continuously used as the normal pilot valve shown in FIGS. 2 and 3 for a long term, the valve seat 31 repeatedly receives stress from the diaphragm valve element 32 for the long term. Conceivably, the valve seat 31 may shrink downwards by plastic-deformation called a creep phenomenon. This may cause a clearance between the rod 51 and the piston rod 21 when the manual valve is placed in the safety mechanism set position S. Hence, if air is supplied through the operation port 24, the piston rod 21 is caused to slide upwards by the clearance against the downward urging force of the springs 22 and 52, leading to a decrease in downward urging force exerted on the diaphragm valve element 32 integral with the piston rod 21. Consequently, the sealing strength between the diaphragm valve element 32 and the valve seat 31 may become insufficient.

Even when air is not supplied through the operation port 24, the diaphragm valve element 32 and the piston rod 21 may be moved to slide upwards by the pressure of chemical liquid flowing into the port 33. This may leads to insufficient sealing strength between the diaphragm valve element 32 and the valve seat 31.

In other words, when the valve seat 31 shrinks downwards by plastic deformation, the sealing strength between the diaphragm valve element 32 and the valve seat 31 becomes insufficient, so that the port 33, the communicating area 35, and the port 34 are communicated with each other. Thus, the chemical liquid supplied to the port 33 might flow out through the port 34.

In FIG. 6, an operating state of the valve-seat following mechanism is illustrated. Specifically, when turned, the feed screw 71 is moved up/down, and the rod 51 inserted in the feed screw 71 is also moved up/down. Here, when the feed screw 71 is turned to move downwards, allowing the rod 51 to move down, thereby moving the piston rod 21 held in contact with the rod 51 downwards. Accordingly, the downward urging force on the diaphragm valve element 32 integral with the piston rod 21 is increased, thus providing sufficient sealing strength between the diaphragm valve element 32 and the valve seat 31.

In other words, by moving the feed screw 71 downwards, the sealing strength is enhanced between the diaphragm valve element 32 and the valve seat 31 to prevent the communication between the port 33, the communicating area 35, and the port 34. It is therefore possible to prevent the chemical liquid supplied to the port 33 from flowing out through the port 34.

Second Embodiment

Figure 9:
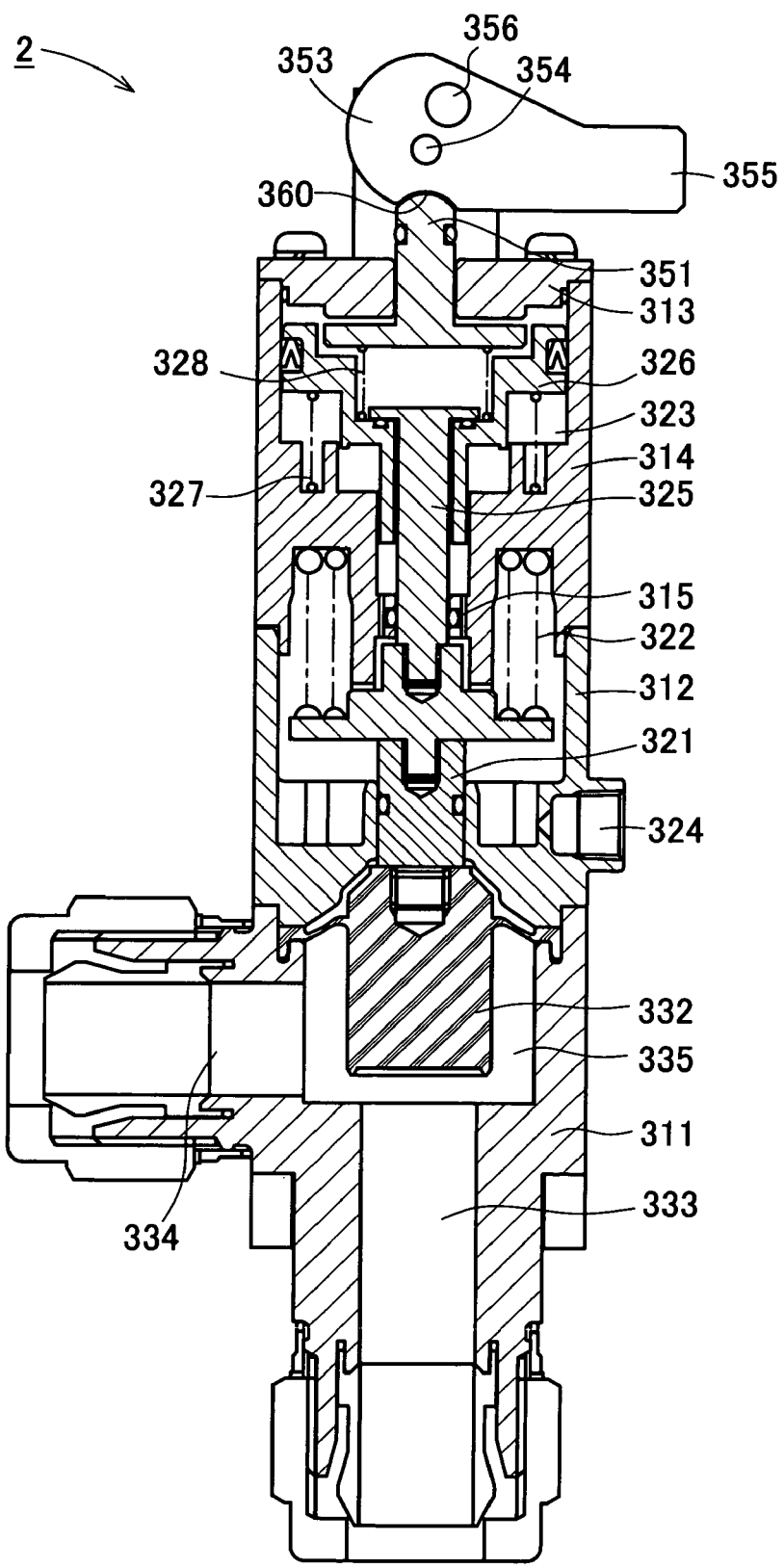
FIG. 9 is a sectional view of the combined valve in a valve open state in the second embodiment.

A combined valve 2 in a second embodiment will be explained with reference to FIGS. 7 and 10. As shown in FIG. 9, a body section of the combined valve 2 includes a valve body 311, cylinder 312, piston cylinder 314, and cover 313, which are integrally formed in one unit. The combined valve 2 is structured of a pilot valve and a manual valve. As for the combined valve 2, "Upper" indicates a manual valve side and "Lower" indicates a pilot valve side.

Firstly, the pilot valve of the combined valve 2 is explained. The pilot valve is further divided into a pilot mechanism and a valve operating mechanism. Here, the pilot mechanism includes the cylinder 312, the cover 313, a piston rod 321, springs 322 and 352, a piston 326, and springs 327 and 328.

These cylinder 312, cover 313, and piston cylinder 314 constitute an airtight container. Mounted in the piston cylinder 314 are the piston 326 slidable therein, the spring 327 which urges the piston 326 upwards, and the spring 328 which urges the piston 326 downwards. The piston 326 partitions the space defined by the piston cylinder 314 and cover 313 into two chambers, upper and lower. The lower chamber is a pressure chamber 323 which is communicated with an operation port 324.

The shaft 325 is inserted in the piston 326 and integrally coupled to the rod 321. Here, the spring 322 is located between the shaft 325 and the piston cylinder 314 to urge the shaft 325 downwards.

The valve operating mechanism includes the valve body 311, a diaphragm valve element 332, and ports 333 and 334. In the valve body 311, the ports 333 and 334 are communicated with each other through a communicating area 335. The diaphragm valve element 332 which will be brought into/out of contact with the valve body 311 is partially sandwiched between the valve body 311 and the cylinder 312. Accordingly, the valve body 311 and the cylinder 312 are airtightly partitioned by the diaphragm valve element 32, preventing the fluid flowing in the communicating area 335 from leaking out to the cylinder 312 side. The diaphragm valve element 332, integrally coupled to the rod 321, is arranged to be separated from the valve body 311 when the rod 321 is not urged downwards and to be brought into contact with the valve body 311 when the rod 332 is urged downwards.

The manual valve of the combined valve 2 is explained below. The manual valve includes an adjusting rod 351, the spring 328, and a knob 353. Above the adjusting rod 351, the knob 353 is attached to be rotatable about an eccentric shaft 354. The knob 353 is provided with a handle 355, a keyhole 356, and a notch 360.

The combined valve 2 having the above structure is operated as follows.

Figure 8:
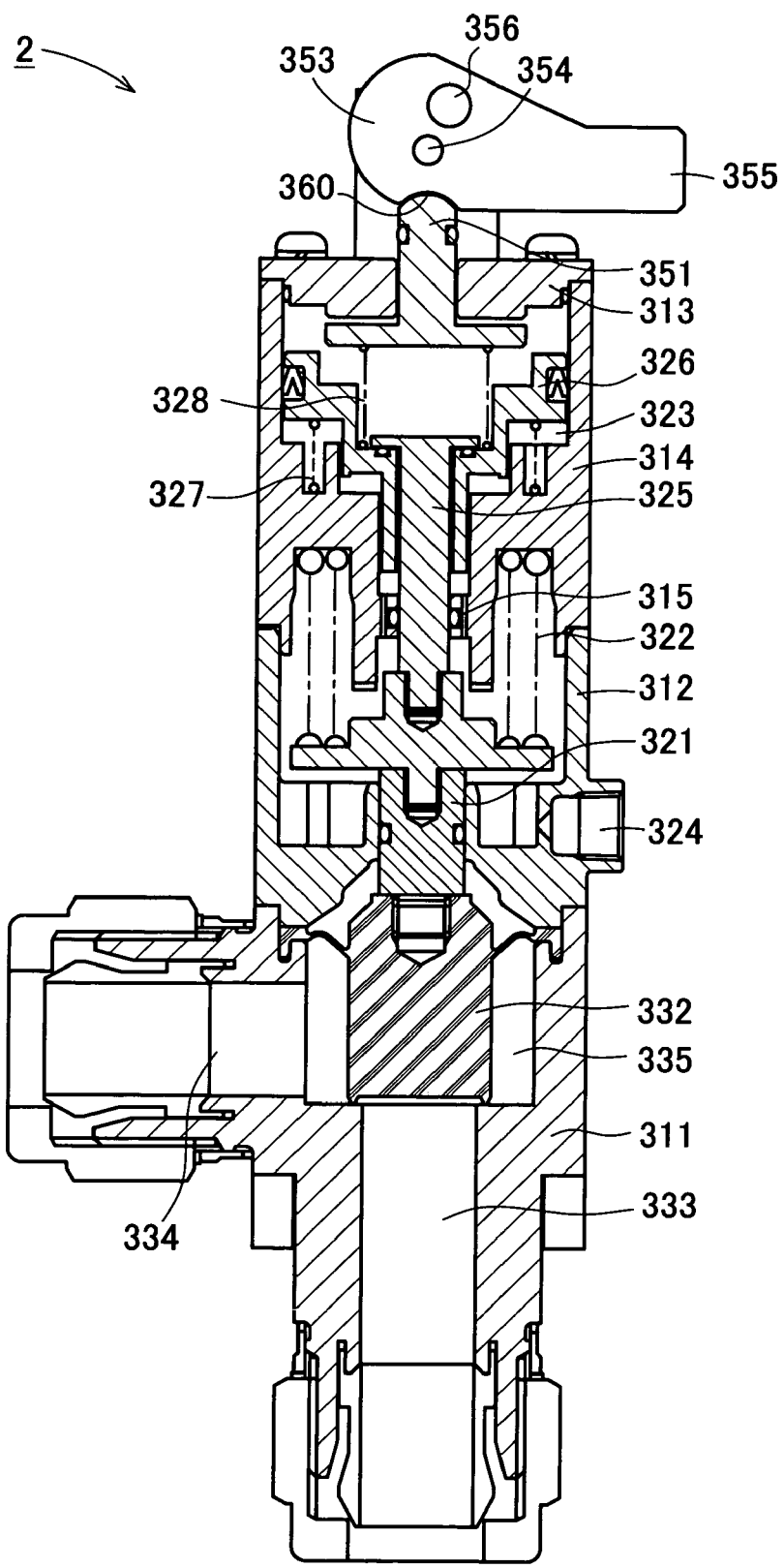
FIG. 8 is a sectional view of the combined valve in the valve closed state in the second embodiment.

A normal operation of the pilot valve will be described first. FIG. 9 shows the combined valve 2 with the manual valve held in a valve opening position and the pilot valve opened to allow the flow of fluid. FIG. 8 shows the combined valve 2 with the manual valve held in the valve opening position but the pilot valve closed to prevent the flow of fluid.

FIG. 9 is first explained. FIG. 9 shows the pilot valve opened by supply of air pressure thereto by an electromagnetic valve not shown. Specifically, when air is supplied to the pilot valve through the operation port 324, the air is fed into the pressure chamber 323 via the air supply passage 315 of the piston cylinder 314. Then, the air pressure in the pressure chamber 323 is increased. Under upward pressure in association with the increase in air pressure in the pressure chamber 323, the piston 326 slides upwards in the piston cylinder 314 against the downward urging force of the spring 328. In association with the upward sliding of the piston 326, the shaft 325 whose flange portion bears on the piston 326 is simultaneously moved upwards against the downward urging force of the spring 322. The rod 321 integral with the shaft 325 is also moved upwards. Accordingly, the diaphragm valve element 332 coupled to the rod 321 is not pressed downwards and is brought out of contact with the valve body 311. Thus, a passage space is generated between the diaphragm valve element 332 and the valve body 311, providing communication between the ports 333 and 334 through the communicating area 335. The fluid supplied into the valve body 311 through the port 333 is then discharged out through the port 334.

Next, FIG. 8 shows the pilot valve in the closed state. Specifically, when air supply into the pressure chamber 323 through the operation port 24 is stopped and the air pressure forcing the piston 326 upwards is reduced, the piston 326 is moved down by the urging force of the springs 327 and 328. Then, the shaft 325 held in contact with the piston 326 is urged downwards by the spring 322 and then the diaphragm valve element 332 integral with the shaft 325 and the rod 321 is brought into contact with the valve body 311.

Accordingly, the flow passage space between the diaphragm valve element 332 and the valve body 311 is closed. This interrupts the communication between the ports 333 and 334 through the communicating area 335 and thus the fluid supplied through port 333 is not allowed to flow out through the port 334.

When the manual valve is located in the valve opening position, opening/closing operation of the pilot valve can be performed by the electromagnetic valve.

Further, when the adjusting rod 351 is engaged in the notch 360 of the knob 353, the manual valve is prevented from shifting to the valve closing position. This makes it possible to ensure the opening/closing operation of the pilot valve by the electromagnetic valve.

Figure 7:
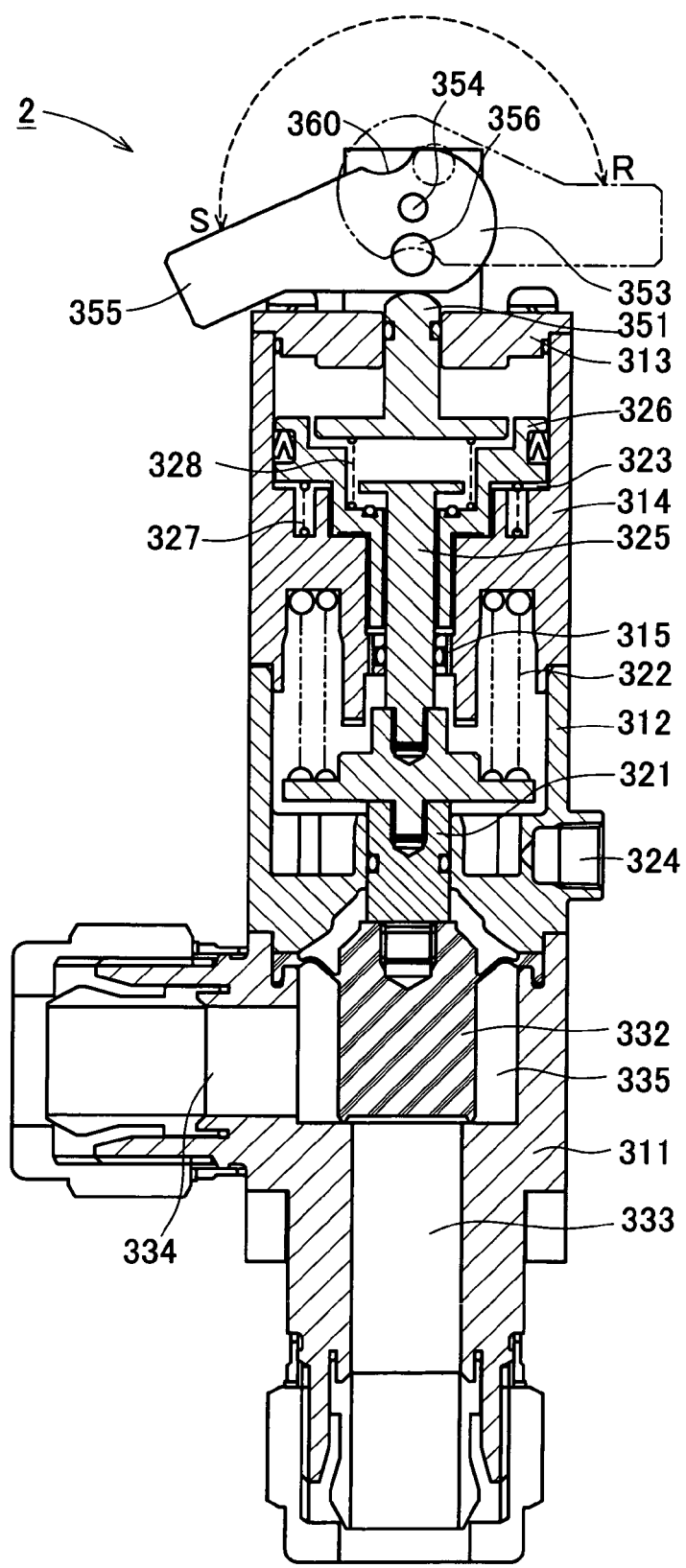
FIG. 7 is a sectional view of a combined valve held in a valve closed state by a manual operating mechanism in a second preferred embodiment.
Figure 10:
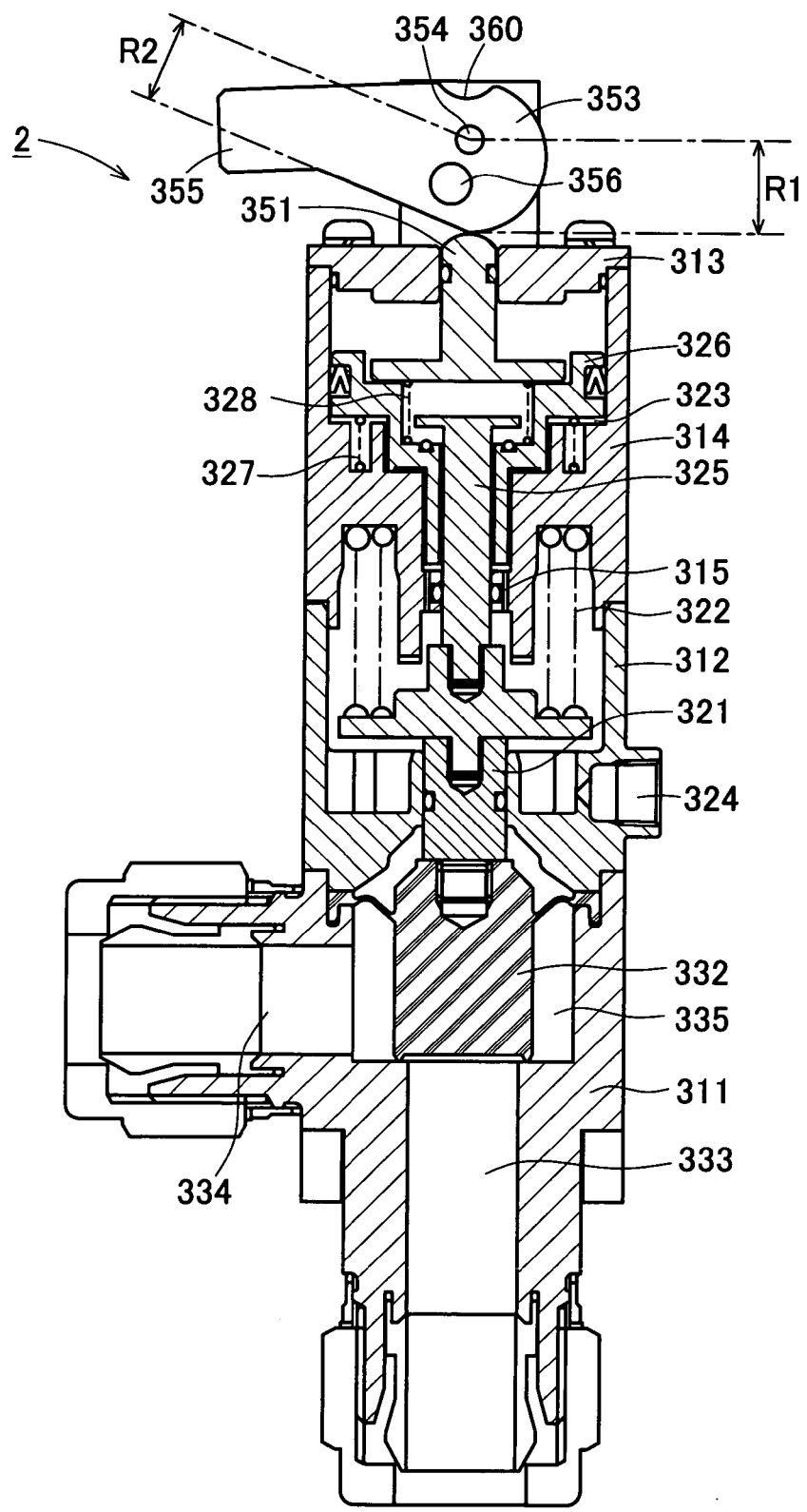
FIG. 10 is a view of the combined valve in the second embodiment, in which the manual operating mechanism is rotated until a knob comes into contact with an adjusting rod at a curvature-changing point of the outer periphery of the knob to change the combined valve from the valve open state to the valve closed state by the manual operating mechanism.

Next, an operation of the manual valve when used by an operator for example as a safety mechanism during maintenance or the like is explained referring to FIGS. 7 and 10. FIG. 7 shows the combined valve 2 with the manual valve in the valve closing position, which is switched from the valve opening position shown in FIG. 8 or 9.

Firstly, explanation is made on the manual valve switched from the valve opening position shown in FIG. 9 to the valve closing position. To be concrete, the operator rotates the handle 355 of the knob 353, 180 degrees counterclockwise in front view, about the eccentric shaft 354 from the valve opening position (hereinafter, referred to as a safety mechanism release position R) to a predetermined position (hereinafter, referred to as a safety mechanism set position S). Here, the predetermined position represents the position where the outer tapered periphery of the knob 353 is in contact with the adjusting rod 351. Then, as the rotating operation is started, the adjusting rod 351 receiving the downward load resulting from the rotation of the handle 355 of the knob 353 is moved down into contact with the piston 326 which is then slid downwards. Accordingly, the piston 326 is brought out of contact with the flange portion of the shaft 325. The shaft 325 becomes movable up and down separately from the piston 326. The shaft 325 is therefore urged downwards by the spring 322. The shaft 325 and the diaphragm valve element 332 integral with the rod 321 are brought into contact with the valve body 311.

On the other hand, explanation is made on the manual valve switched from the valve opening position shown in FIG. 8 to the valve closing position. To be concrete, the operator rotates the handle 355 of the knob 353 from the safety mechanism release position R to the safety mechanism set position S. Then, as the rotating operation is started, the adjusting rod 351 receiving the downward load resulting from the rotation of the handle 355 of the knob 353 is moved down into contact with the piston 326 which is then slid downwards. Accordingly, the piston 326 is brought out of contact with the flange portion of the shaft 325. The shaft 325 becomes movable up and down separately from the piston 326. However, the shaft 325 is urged downwards by the spring 322. The shaft 325 and the diaphragm valve element 332 integral with the rod 321 are thus held in contact with the valve body 311.

As above, when the manual valve is rotated form the valve opening position shown in FIGS. 8 and 9 to the valve closing position, the flow passage space between the diaphragm valve element 332 and the valve body 311 is closed, interrupting the communication between the ports 333 and 334 through the communicating area 335. Thus, the fluid flowing in the port 333 is prevented from flowing out through the port 334.

In other words, even where the pilot valve is in a valve open state as shown in FIG. 9, the operator may rotate the handle 355 from the safety mechanism release position R to the safety mechanism set position S to forcibly switch the pilot valve from the valve open state to the valve closed state. Accordingly, in case of emergency where fluid discharge should be stopped immediately, the operator can react to the emergency case appropriately.

Further, when the knob 353 is rotated to the position (FIG. 7) where the outer tapered periphery of the knob 353 makes contact with the adjusting rod 351, the handle 355 of the knob 353 can be locked in the safety mechanism set position S.

Here, the reason why the handle 355 of the knob 353 can be locked in the safety mechanism set position S is as described below. Specifically, the distance (hereinafter, referred to as a "distance R1") from the center point of the eccentric shaft 354 of the knob 353 to an inflection point of the outer periphery of the knob 353 in FIG. 10 is longer than the distance (hereinafter, referred to as a "distance R2") from the center point of the eccentric shaft 354 of the knob 353 to the outer tapered periphery of the knob 353. Therefore the handle 355 of the knob 353 is held against rotation unless it receives a force pressing the adjusting rod 351 downwards by a distance corresponding to the difference between the distances R1 and R2 against the urging force of the spring 328. The handle 355 can thus be locked in the state shown in FIG. 7.

The pilot valve can be maintained in the valve open state even if air is supplied thereto through the operation port 324.

In other words, when the manual valve is placed in the valve closing position by the operator as shown in FIG. 7, the fluid is prevented from flowing out even when air is supplied through the operation port 324 due to malfunction. Accordingly, the operator is allowed to safely perform maintenance or the like.

In addition, for example a padlock 357 may be inserted in the keyhole 356 of the knob 353 in the state of FIG. 7 by the operator. This case is the same as in the combined valve 1 in the first embodiment and therefore the details are not repeated here.

Further, when the handle 355 of the knob 353 in FIG. 9 is rotated from the safety mechanism release position R to the safety mechanism set position S, as the rotating operation is started, the adjusting rod 351 receives the downward load resulting from the rotation of the handle 355 of the knob 353 and then is brought into contact with the piston 326 even where air is supplied to the operation port 324 by the electromagnetic valve not shown. The piston 326 is slid downwards, separating from the flange portion of the shaft 325. Then, the air supplied through the operation port 324 and the air in the pressure chamber 323 are released through a gap generated between the piston 326 and the flange portion of the shaft 325 separated therefrom. Consequently, the air pressure in the enclosed space formed by the cover 313 placed above the piston 326, the piston cylinder 314, and the adjusting rod 351 becomes equal to the air pressure in the pressure chamber 323 under the piston 326. As for the adjusting rod 351, accordingly, upward thrust to the piston 326 resulting from the air pressure in the pressure chamber 323 is reduced. As a result, the upward thrust to the piston 326 resulting from the air pressure in the pressure chamber 323 is reduced. The handle 355 of the knob 353 can therefore be rotated when applied enough load against the upward urging force of the spring 327.

The operator is allowed to close the manual valve without applying a large force to counterbalance the air pressure.

Third Embodiment

Figure 11:
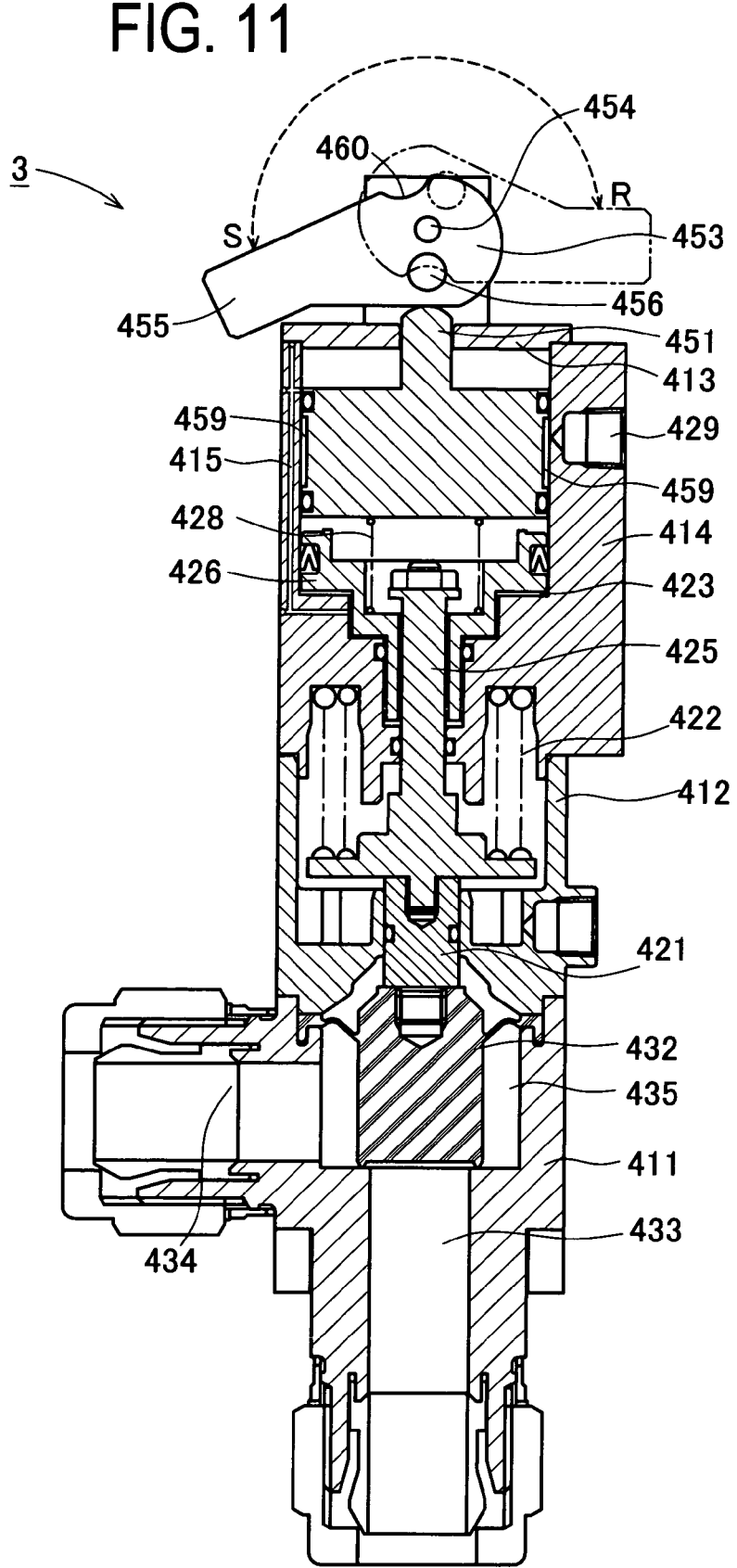
FIG. 11 is a sectional view of a combined valve held in a valve closed state by a manual operating mechanism in a third preferred embodiment.
Figure 12:
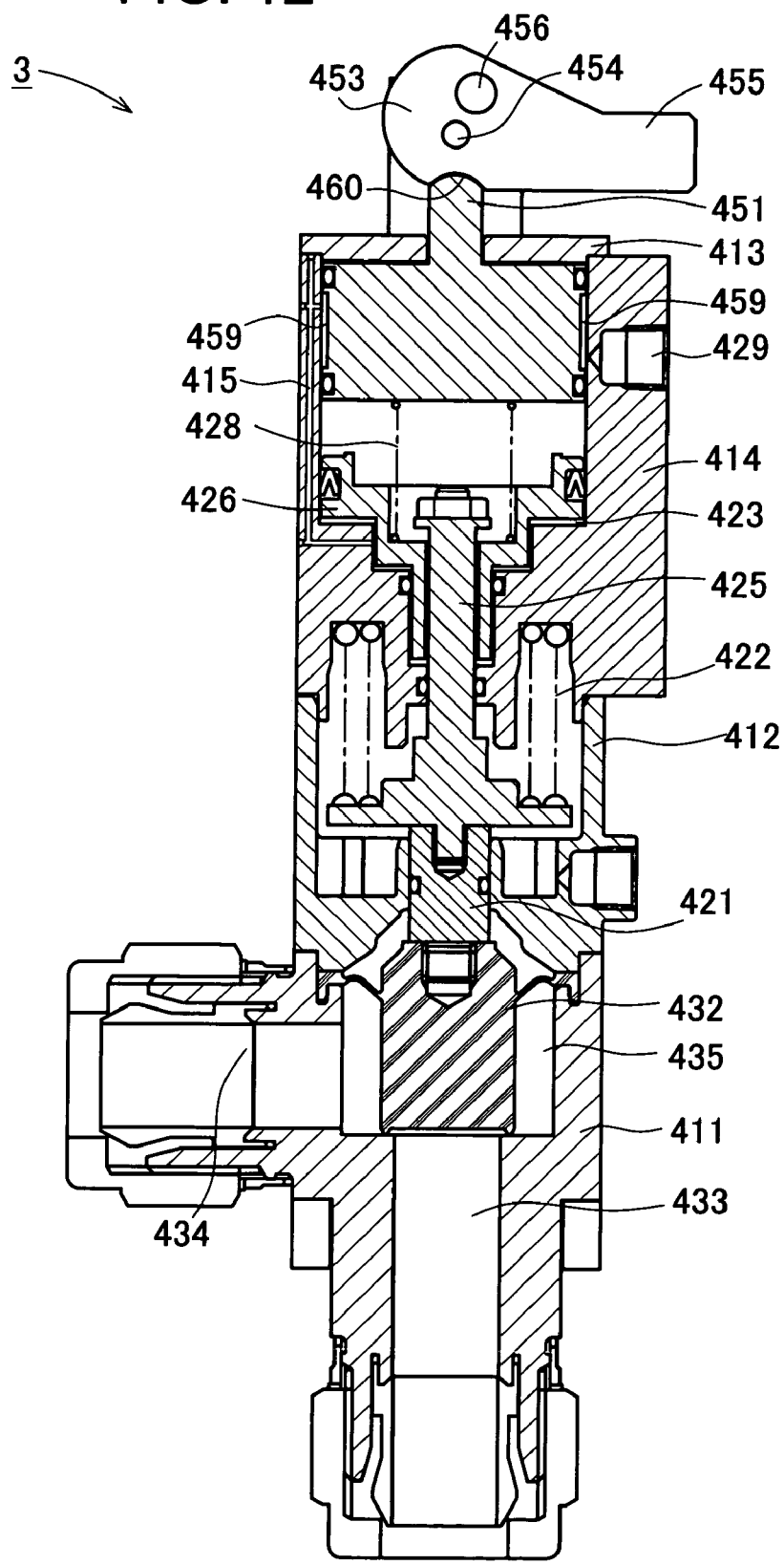
FIG. 12 is a sectional view of the combined valve in the valve closed state in the third embodiment.
Figure 13:
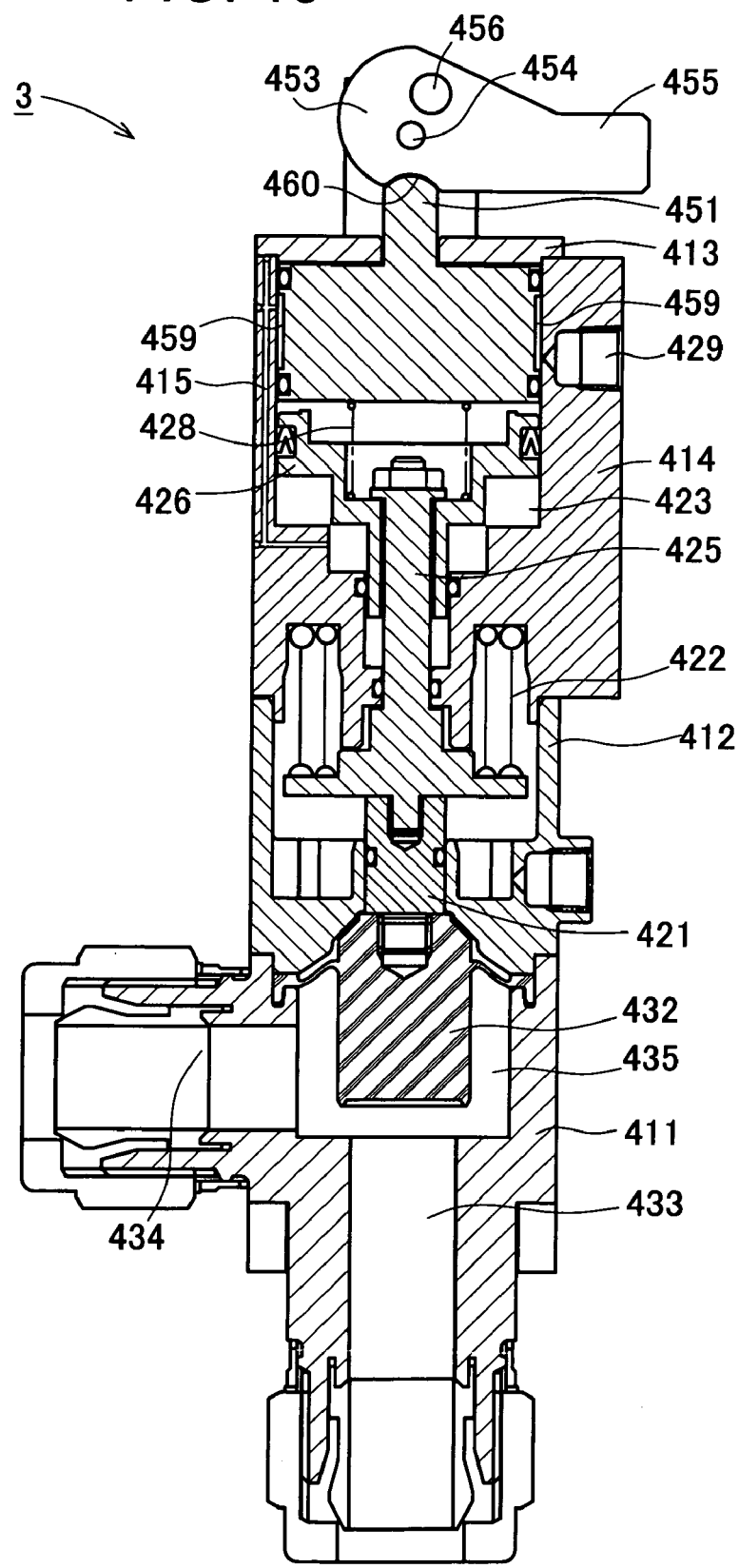
FIG. 13 is a sectional view of the combined valve in the valve open state in the third embodiment.
Figure 14:
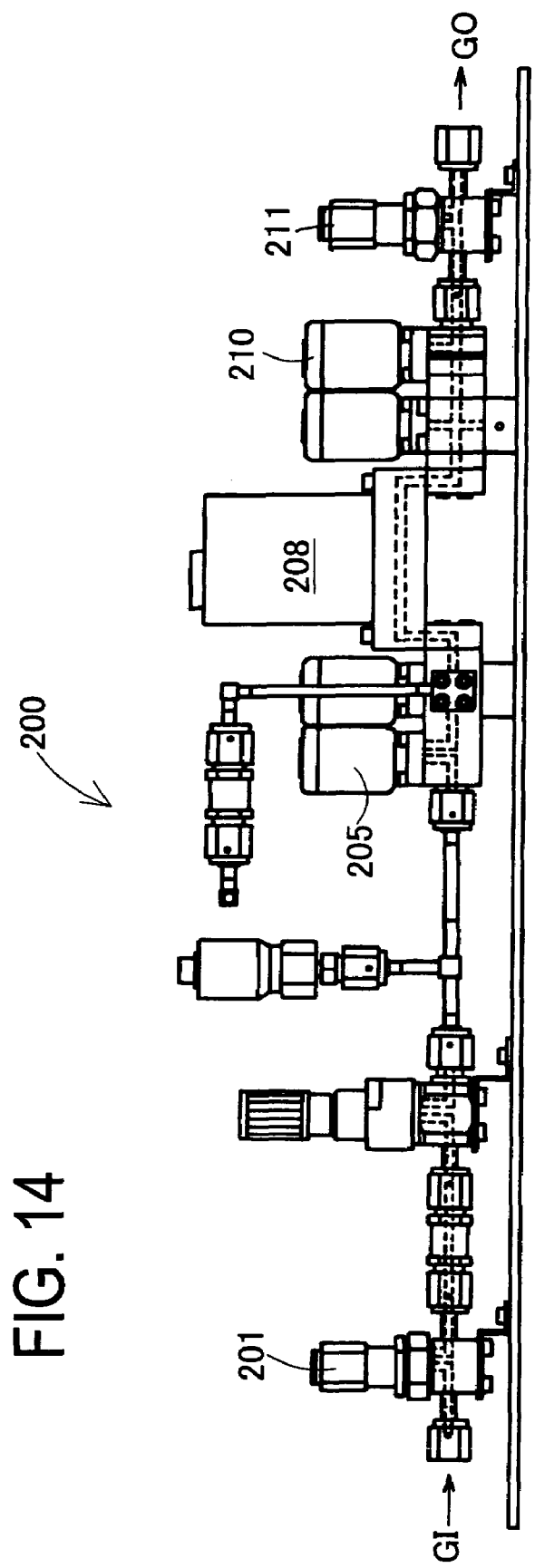
FIG. 14 is a view showing a structure of a process gas unit in a prior art.
Figure 15:
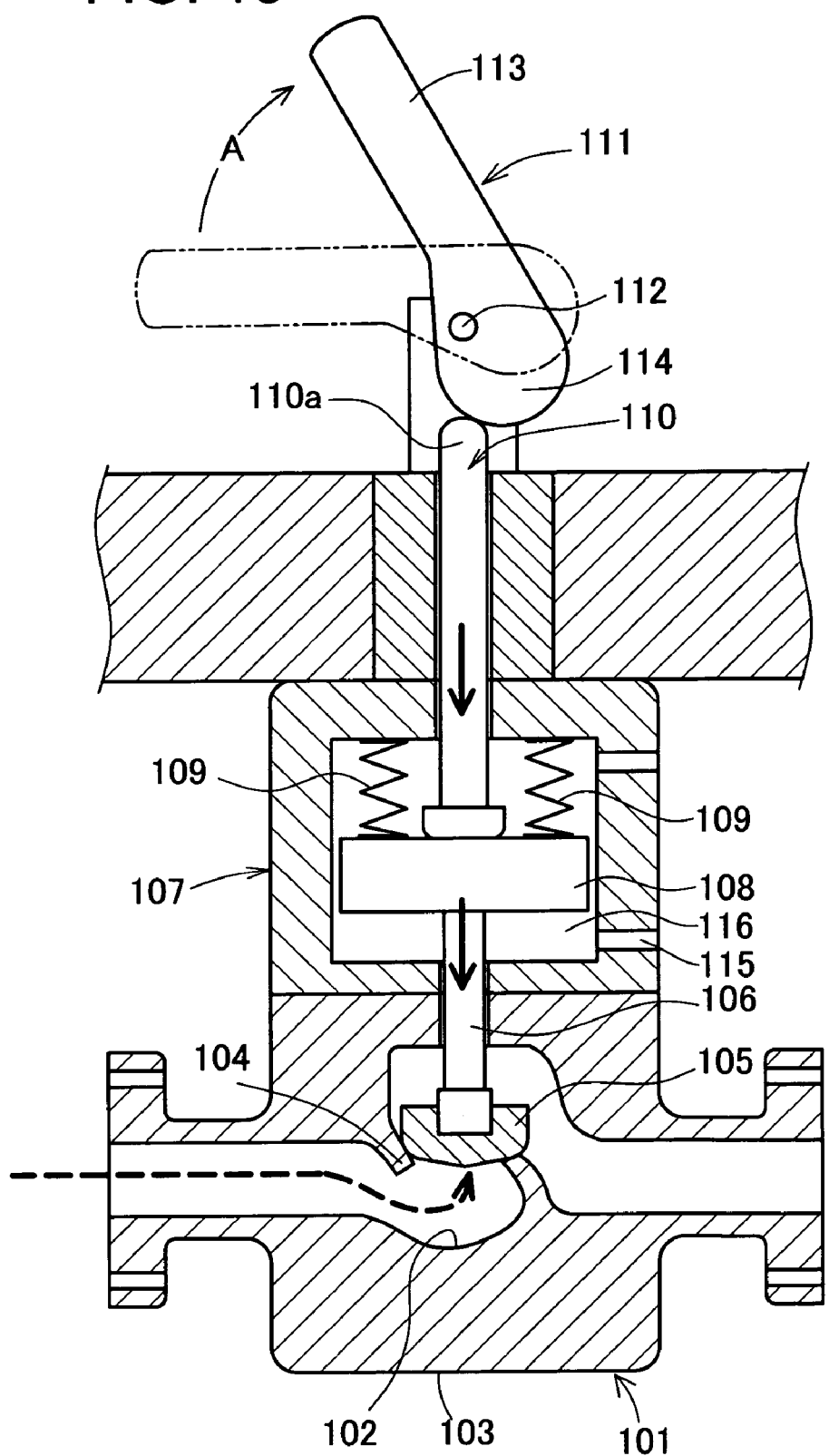
FIG. 15 is a view showing an air-operated valve with an operating lever valve in the prior art.

A combined valve 3 in a third embodiment is explained referring to FIGS. 11 to 13.

As shown in FIG. 13, a body section of the combined valve 3 includes a valve body 411, cylinder 412, piston cylinder 414, and cover 413, which are integrally formed in one unit. The combined valve 3 is structured of a pilot valve and a manual valve. As for the combined valve 3, "Upper" indicates a manual valve side and "Lower" indicates a pilot valve side.

Firstly, the pilot valve of the combined valve 3 is explained. The pilot valve is further divided into a pilot mechanism and a valve operating mechanism. Here, the pilot mechanism includes the cylinder 412, the piston cylinder 414, a rod 421, a spring 422, a shaft 425, a piston 426, and a spring 428.

The piston cylinder 414 and the adjusting rod 451 constitute an airtight container in which the piston 426 is slidably mounted. The spring 428 is placed to urge the adjusting rod 451 upwards and the piston 426 downwards. The piston 426 partitions the space defined by the piston cylinder 414 and the adjusting rod 451 into two chambers, upper and lower. The lower chamber is a pressure chamber 423 which is communicated with an operation port 429 through an air supply passage 415 of the piston cylinder 414 and an air supply passage 459 formed in the outer periphery of the adjusting rod 451.

Further, the shaft 425 is inserted in the piston 426 and coupled to the rod 421. Here, the spring 422 is placed in contact with the shaft 425 to urge the shaft 425 and the rod 421 downwards.

On the other hand, the valve operating mechanism includes the valve body 411, a diaphragm valve element 432, ports 433 and 434. This structure is the same as in the combined valve 2 in the second embodiment and therefore the details thereof are not repeated here.

Next, the manual valve of the combined valve 3 is explained. The manual valve includes the adjusting rod 451, spring 428, and knob 453. The basic structure of the combined valve 3 except for the shape of the adjusting rod 451 is similar to that of the combined valve 2 in the second embodiment and its explanation is omitted here.

The combined valve 3 having the above structure is operated as follows.

A normal operation of the pilot valve will be described first. FIG. 13 shows the combined valve 3 with the manual valve held in the valve opening position and the pilot valve opened to allow the flow of fluid. FIG. 12 shows the combined valve 3 with the manual valve held in the valve opening position but the pilot valve closed to prevent the flow of fluid.

FIG. 13 is first explained. FIG. 13 shows the pilot valve opened by supply of air pressure thereto through an electromagnetic valve not shown. Specifically, when air is supplied to the pilot valve through the operation port 429, the air is fed into the pressure chamber 423 via the air supply passage 459 formed on the outer periphery of the adjusting rod 451 and the air supply passage 415 of the cylinder 414. Then, the air pressure in the pressure chamber 423 is increased. Under upward pressure in association with the increase in air pressure in the pressure chamber 423, the piston 426 is allowed to slide upwards in the piston cylinder 414 against the downward urging force of the spring 428. In association with the upward sliding of the piston 426, the shaft 425 whose flange portion bears on the piston 426 is simultaneously moved upwards against the downward urging force of the spring 422. The rod 421 coupled to the shaft 425 is also moved upwards. Accordingly, the diaphragm valve element 432 coupled to the rod 421 is not pressed downwards and is brought out of contact with the valve body 411. Thus, a passage space is generated between the diaphragm valve element 432 and the valve body 411, providing communication between the ports 433 and 434 through the communicating area 435. The fluid supplied into the valve body 41 through the port 433 is then discharged out through the port 434.

Next, FIG. 12 shows the pilot valve in a closed state. Specifically, air supply into the pressure chamber 423 through the operation port 429 is stopped and the air pressure forcing the piston 426 upwards is reduced. The subsequent operations are similar to those in the combined valve 2 in the second embodiment and therefore the details are not repeated here.

Next, an operation of the manual valve when used by an operator for example as a safety mechanism during maintenance or the like is explained referring to FIG. 11. FIG. 11 shows the combined valve 2 with the manual valve in the valve closing position, which is switched from the valve opening position shown in FIG. 12 or 13. This operation is similar to in the combined valve 2 in the second embodiment and therefore the details of switching of the manual valve from the valve opening position to the valve closing position are omitted here.

Further, when the knob 453 is rotated to the position where the outer tapered portion of the knob 453 comes into contact with the adjusting rod 451, as shown in FIG. 11, the handle 455 of the knob 453 can be locked in the safety mechanism set position S. The subsequent operations are similar to those in the combined valve 2 in the second embodiment and therefore the details thereof are not repeated here.

In addition, for example a padlock 457 may be inserted in a keyhole 456 of the knob 453 in the state of FIG. 11 by the operator. This case is the same as in the combined valve 1 in the first embodiment and the combined valve 2 in the second embodiment and therefore the details thereof are omitted here.

Further, when the handle 455 of the knob 453 in FIG. 13 is rotated from the safety mechanism release position R to the safety mechanism set position S, as the rotating operation is started, the communication between the air supply passage 459 of the adjusting rod 451 and the air supply passage 415 of the piston cylinder 414 is interrupted even where air is supplied to the operation port 429 by the electromagnetic valve not shown. The air is not supplied through the operation port 429. Consequently, the handle 455 of the knob 453 is allowed to be rotated under no air pressure thereon.

In other words, the operator is allowed to rotate the manual valve to the valve closing position without applying a large force to the manual valve.

Fourth Embodiment

A combined valve 4 in a fourth embodiment is explained referring to FIGS. 16 to 20.

Figure 18:
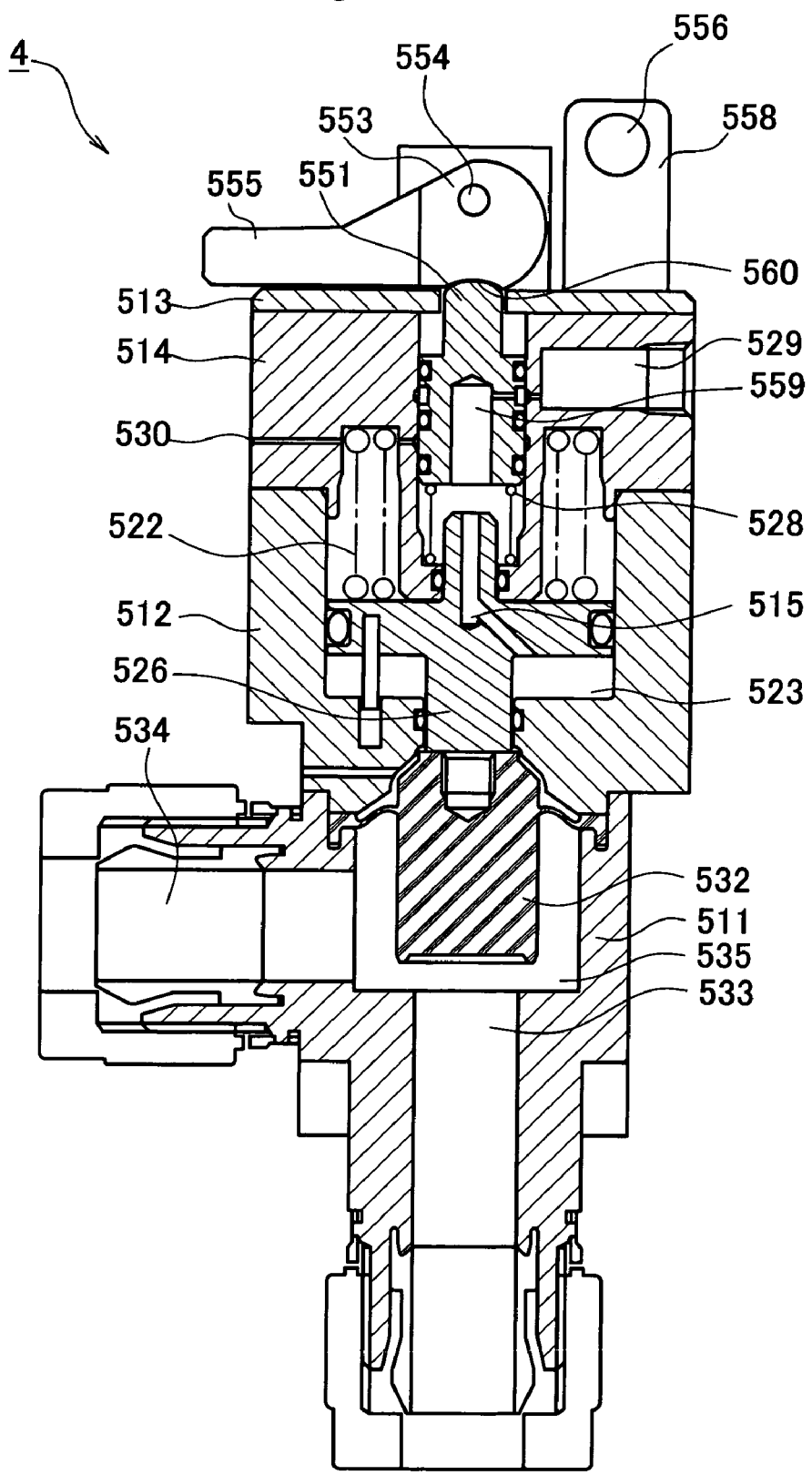
FIG. 18 is a sectional view of the combined valve in a valve open state in the fourth embodiment.

As shown in FIG. 18, a body section of the combination 4 includes a valve body 511, piston cylinder 512, spool cylinder 514, and cover 513, which are integrally formed in one unit. The combined valve 4 is structured of a pilot valve and a manual valve. As for the combined valve 4, "Upper" indicates a manual valve side and "Lower" indicates a pilot valve side.

Firstly, the pilot valve of the combined valve 4 is explained. The pilot valve is further divided into a pilot mechanism and a valve operating mechanism. Here, the pilot mechanism includes the cylinder 512, the spool cylinder 514, a spring 522, and a piston 526.

The piston cylinder 512 and the spool cylinder 514 constitute an airtight container in which the piston 526 is slidably mounted. The spring 522 is located to urge the spool cylinder 514 upwards and the piston 526 downwards.

The piston 526 partitions the space defined by the piston cylinder 512 and the spool cylinder 514 into two chambers, upper and lower. The lower chamber is a pressure chamber 523 which is communicated with an operation port 529 through an air supply passage 515 formed in the piston 526 and an air supply passage 559 formed in an adjusting rod 551 mentioned later. Alternatively, the pressure chamber 523 is communicated with an exhaust port 529 through the air supply passage 515 of the piston 526.

On the other hand, the valve operating mechanism includes the valve body 511, a diaphragm valve element 532, and ports 533 and 534. This structure is the same as in the combined valve 2 in the second embodiment and the combined valve 3 in the third embodiment and therefore the details thereof are not repeated here.

Figure 20:
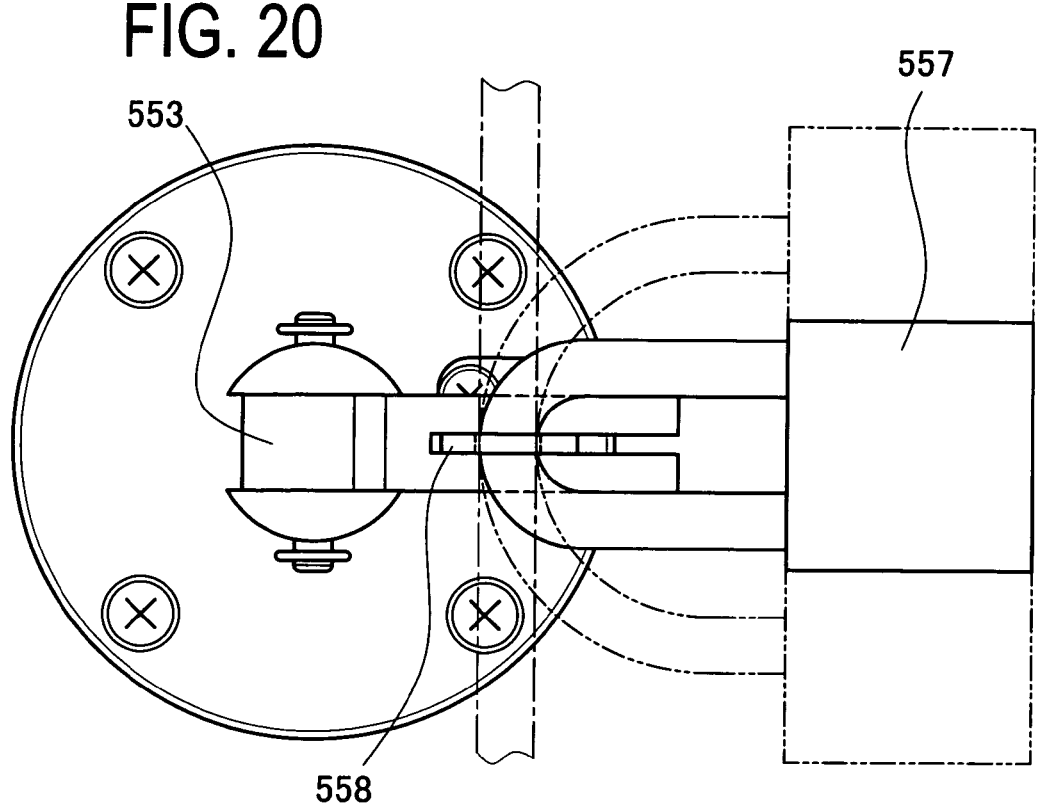
FIG. 20 is a view showing a positional relation between the knob and the bracket.
Figure 20:
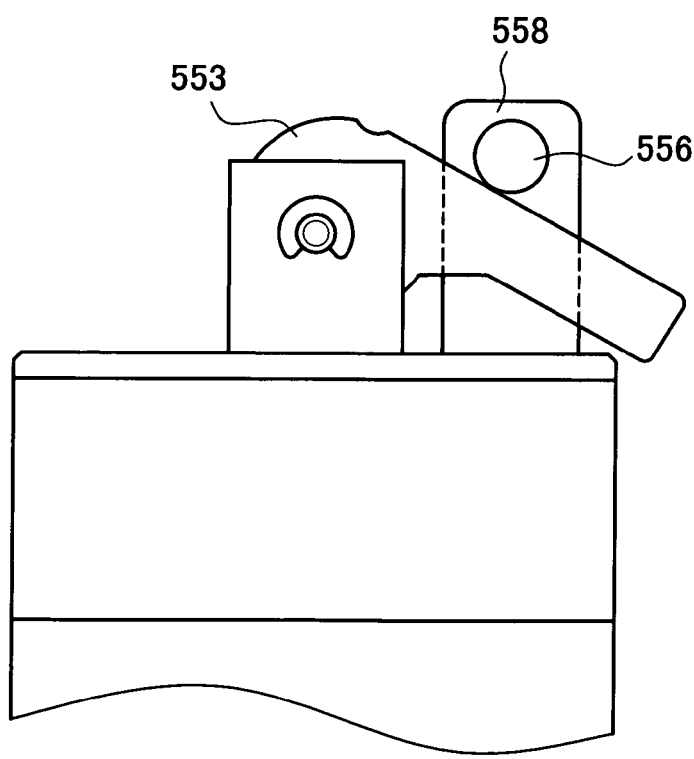

Next, the manual valve of the combined valve 4 is explained. The manual valve includes the adjusting rod 551, the spring 528, the knob 553, and a bracket 558. Attached above the adjusting rod 551 is a knob 553 rotatable about an eccentric shaft 554. This knob 553 includes a handle 555 and a notch 560. An air supply passage 559 is formed in the adjusting rod 551, providing a simple passage structure easy to make. As shown in FIG. 20, furthermore, the bracket 558 is interposed between two arms of the forked handle of the knob 553. The bracket 558 is formed with a keyhole 556.

The combined valve 4 having the above structure is operated as follows.

Figure 19:
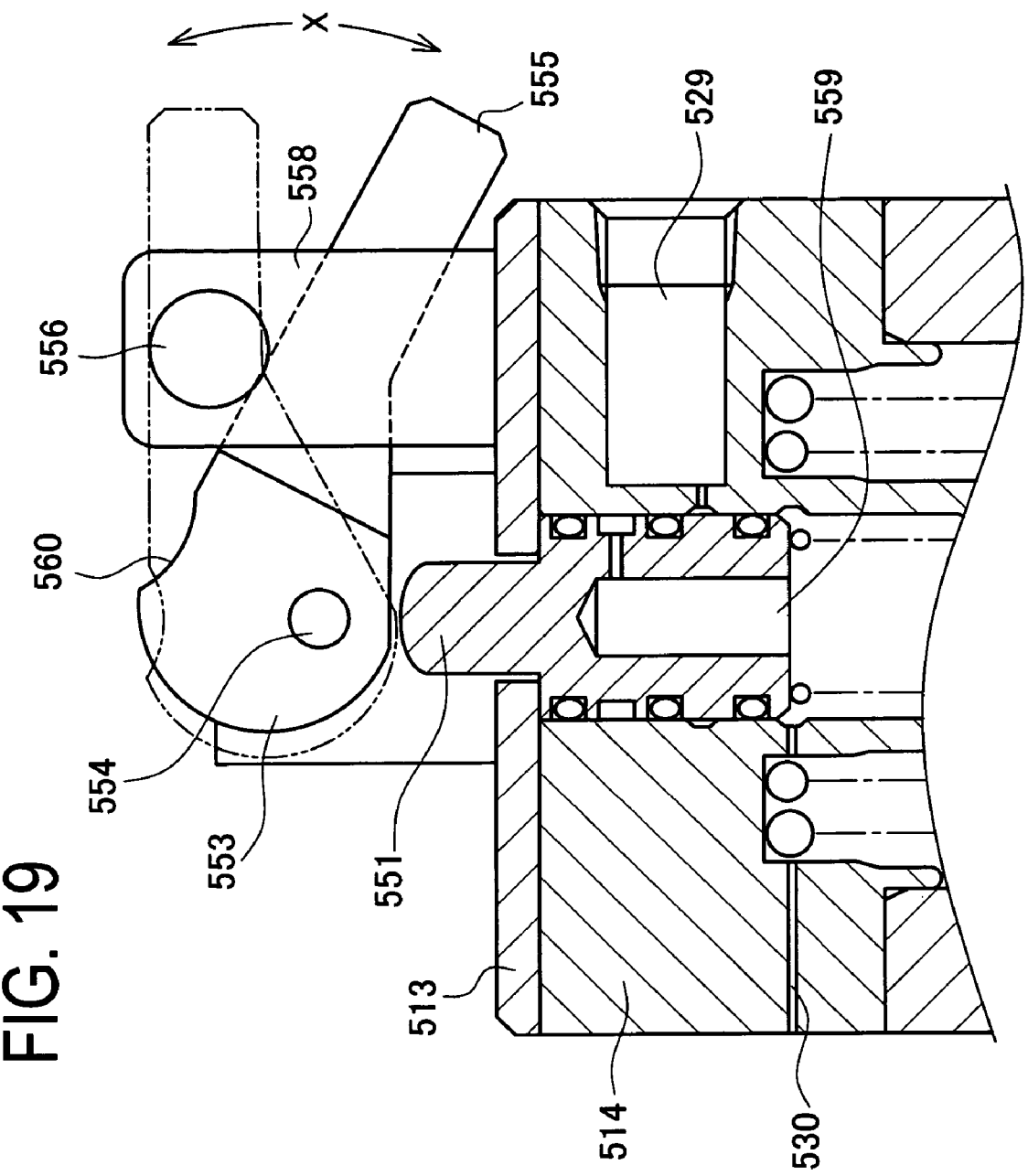
FIG. 19 is a view showing the position of a keyhole in a bracket and rotational play of a handle of the knob.

A normal operation of the pilot valve will be described first. FIG. 18 shows the combined valve 4 with the manual valve held in a valve opening position and the pilot valve opened to allow the flow of fluid. FIG. 19 shows the combined valve 4 with the manual valve held in the valve opening position but the pilot valve closed to prevent the flow of fluid.

FIG. 18 is first explained. FIG. 18 shows the pilot valve opened by supply of air pressure thereto through an electromagnetic valve not shown. Specifically, when air is supplied to the pilot valve through the operation port 529, the air is fed into the pressure chamber 523 via the air supply passage formed in the adjusting rod 551 and the air supply passage 515 of the piston 526. Then, the air pressure in the pressure chamber 523 is increased. Under upward pressure in association with the increase in air pressure in the pressure chamber 523, the piston 526 is allowed to slide upwards in the piston cylinder 512 against the downward urging force of the spring 522. Accordingly, the diaphragm valve element 532 integral with the piston 526 is not pressed downwards and then is brought out of contact with the valve body 511. Thus, a passage space is generated between the diaphragm valve element 532 and the valve body 511, providing communication between the ports 533 and 534 through the communicating area 535. The fluid supplied into the valve body 511 through the port 533 is then discharged out through the port 534.

Figure 17:
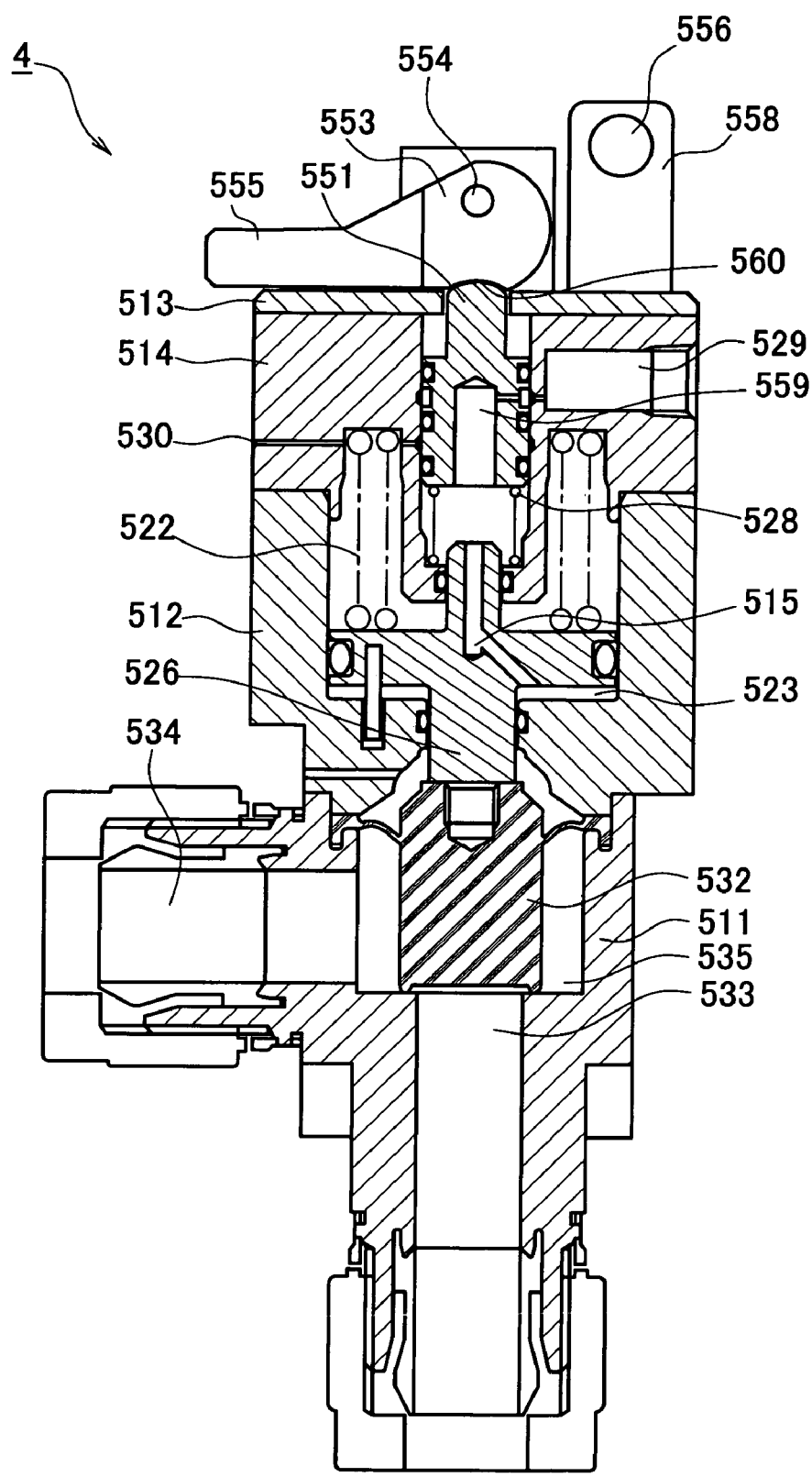
FIG. 17 is a sectional view of the combined valve in the valve closed state in the fourth embodiment.

Next, FIG. 17 shows the pilot valve in a closed state. Specifically, air supply into the pressure chamber 523 through the operation port 529 is stopped and the air pressure forcing the piston 526 upwards is reduced. The subsequent operations are simply the reverse of the above mentioned operations for opening the pilot valve by supply of air pressure, and the details thereof are not repeated here.

Figure 16:
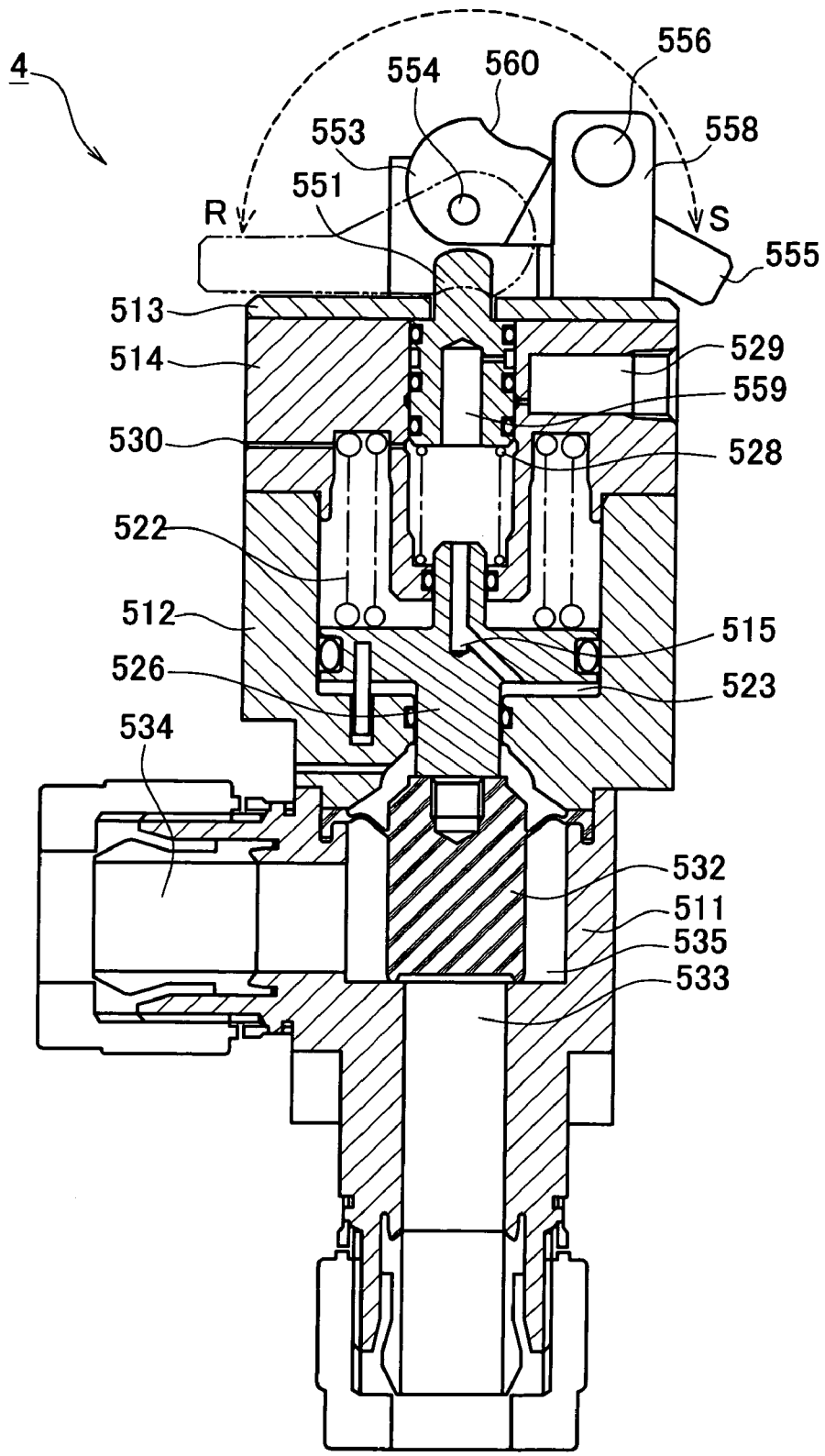
FIG. 16 is a sectional view of a combined valve held in a valve closed state by a manual operating mechanism in a fourth preferred embodiment.

Next, an operation of the manual valve when used by an operator for example as a safety mechanism during maintenance or the like is explained referring to FIG. 16. FIG. 16 shows the combined valve 4 with the manual valve in the valve closing position, which is switched from the valve opening position shown in FIG. 17 or 18.

Firstly, explanation is made on the manual valve switched from the valve opening position shown in FIG. 18 to the valve closing position. To be concrete, the operator rotates the handle 555 of the knob 553 clockwise in front view about the eccentric shaft 554 from the valve opening position (hereinafter, referred to as a safety mechanism release position R) to a predetermined position (hereinafter, referred to as a safety mechanism set position S). Then, a pressing force of the handle 555 of the knob 553 is decreased as the rotation thereof is started, thereby allowing the adjusting rod 551 to move upwards. In this state, the communication between the operation port 529 and the air supply passage 559 of the adjusting rod 551 is closed, whereas the pressure chamber 523 is brought into communication with the exhaust port 530. Accordingly, the air in the pressure chamber 523 is exhausted through the exhaust port 530, causing the downward sliding of the piston 526 by the urging force of the spring 522. Then, the diaphragm valve element 532 integral with the piston 526 is moved downwards into contact with the valve body 511. The combined valve 4 is thus placed in the valve closed state as shown in FIG. 16.

In the above operation, only the adjusting rod 551 is moved by the knob 553 and the piston 526 is not pressed. Accordingly, the piston 526 receives no force resulting from the rotation of the knob 553, and the valve body 511 receives only the urging force of the spring 522 through the piston 526 and the diaphragm valve element 532. No creep will therefore be caused, so that the sealing strength of the valve operating mechanism can be ensured.

Further, for example a padlock 557 may be inserted in the keyhole 556 of the bracket 558 in the state of FIG. 16 by the operator. In this case, the handle 555 is prevented from rotating even where air is supplied to the operation port 529, so that the pilot valve can be maintained in the valve closed state (FIG. 20). Referring to FIG. 19, the keyhole 556 of the bracket 558 is designed to have sufficient play or clearance to hold the adjusting rod 551 against movement even if the handle 555 wobbles when the padlock 557 is inserted in the keyhole 556. In other words, the keyhole 556 has play enough to prevent the knob 553 from making contact with the adjusting rod 551 even when the knob 553 is rotated and the handle 555 touches a shackle of the padlock 557. The adjusting rod 551 is therefore held against movement even when the operator erroneously touches the handle 555. Thus, no air will be supplied into the pressure chamber 523 through the operation port 529. In FIG. 19, an arrow X indicates a moving range of the handle 555 where the adjusting rod 51 is held against movement. As an alternative, the bracket 558 may be formed to have a reduced thickness. In this case, a padlock 557 with a shackle having a curved end smaller in radius may be used as shown in FIG. 20.

Further, when the handle 555 of the knob 553 in FIG. 18 is rotated from the safety mechanism release position R to the safety mechanism set position S, as the rotation of the handle 555 is started, the communication between the air supply passage 559 of the adjusting rod 551 and the operation port 529 is interrupted even where air is supplied to the operation port 529 by an electromagnetic valve not shown. Consequently, no air is supplied through the operation port 529 and the handle 555 of the knob 553 is thus allowed to be rotated without the air pressure thereon. In the combined valve 4 in the fourth embodiment, particularly, the diameter of the adjusting rod 551 is small and therefore the upward air pressure exerted on the adjusting rod 551 is low. Even at the beginning of rotation of the handle 555 of the knob 553, the operator does not have to apply strong force to rotate the handle 555.

In other words, the above structure enables the operator to readily rotate the manual valve to the valve closing position.

In the combined valve 4, moreover, the air supply passage 515 is formed in the piston 526 and the spring 528 is located inside the spring 522 in a height direction as shown in FIGS. 16 to 18. Accordingly, the combined valve 4 is of a smaller height as compared with the combined valves in the above embodiments. Here, a component urging the adjusting rod 551, namely, the spring 528 in the present embodiment corresponds to the springs 328 and 428 in the combined valves 2 and 3 in the second and third embodiment respectively. If particularly paying attention to the positional relation of those springs, it is to be understood that the combined valve 4 is shorter in height than the combined valves 2 and 3 in the second and third embodiments.

Fifth Embodiment

A combined valve 5 in a fifth embodiment is explained referring to FIGS. 21 to 32.

Figure 21:
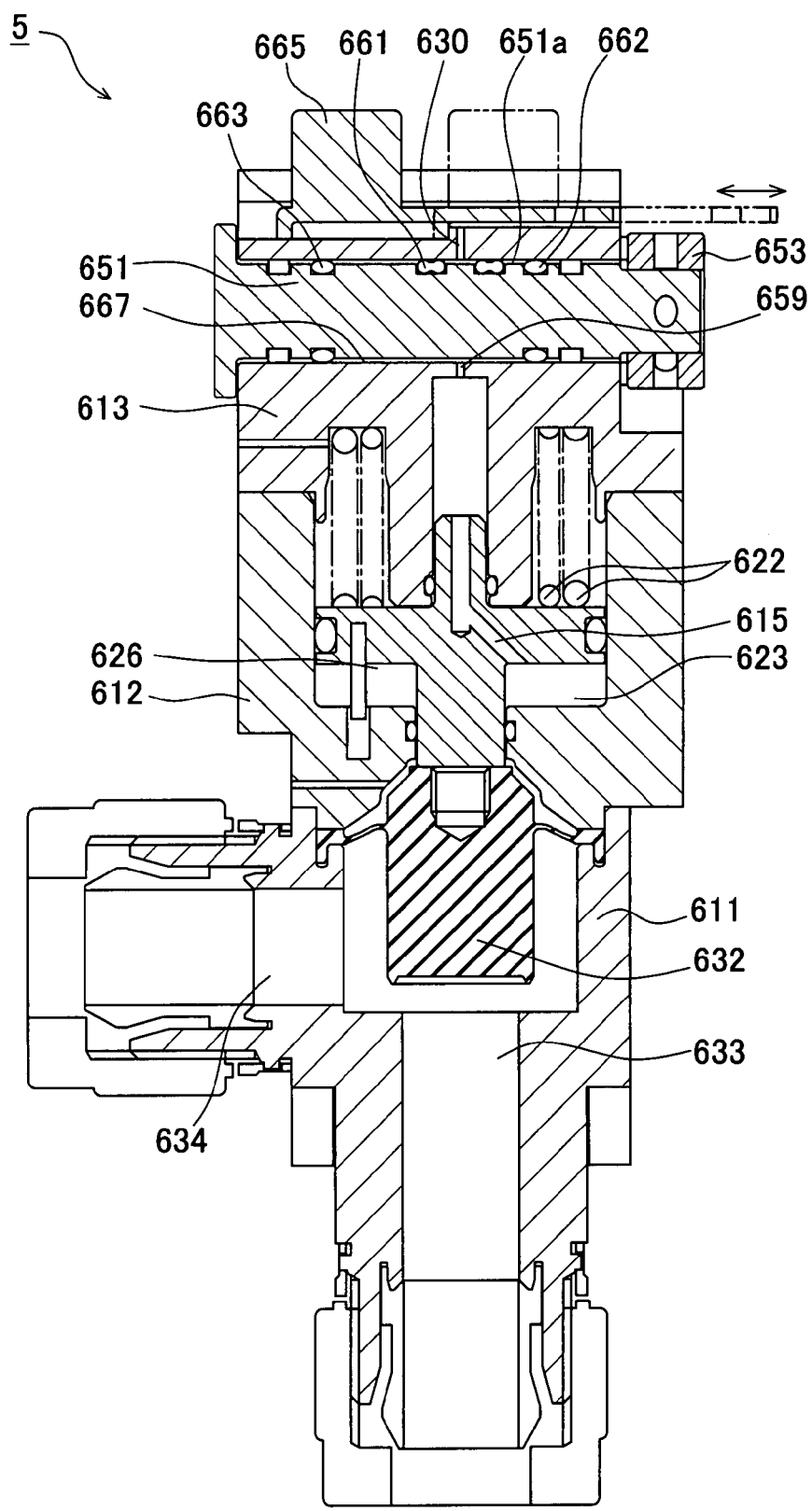
FIG. 21 is a sectional view of a combined valve in a valve open state in a fifth preferred embodiment.
Figure 22:
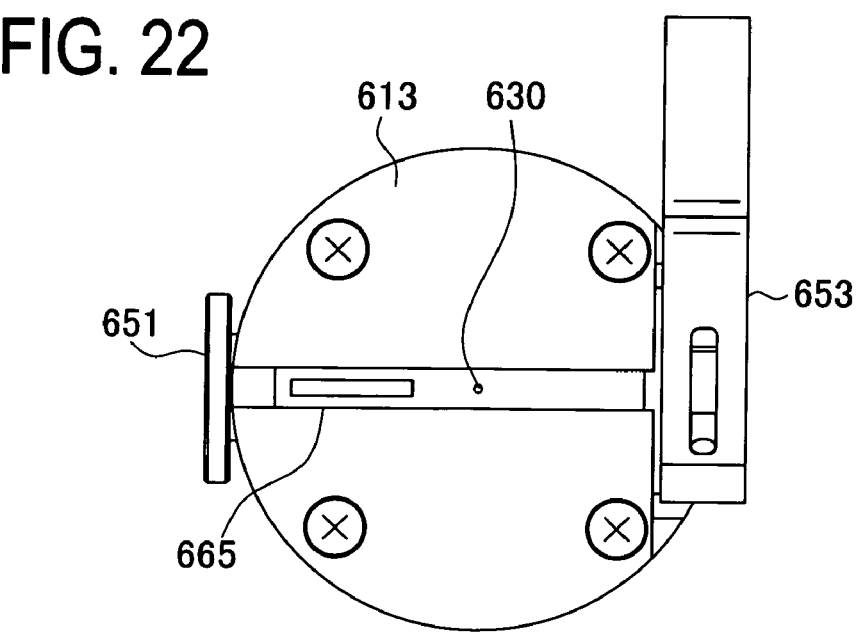
FIG. 22 is a top view of the combined valve in the fifth embodiment.
Figure 23:
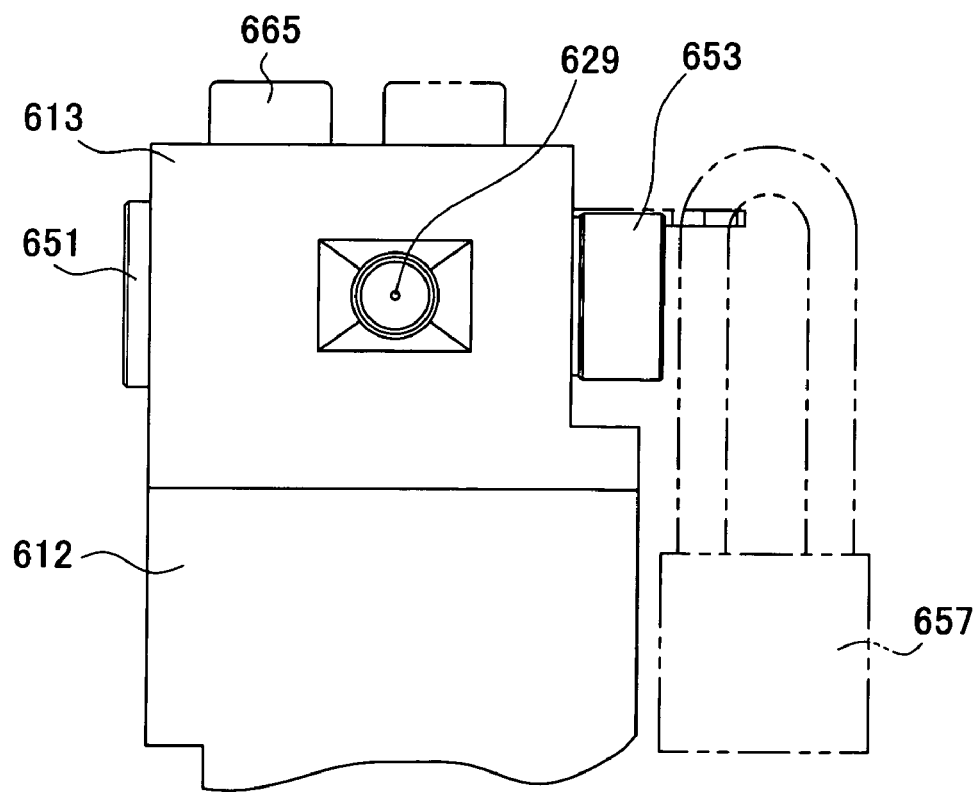
FIG. 23 is an external view of an upper part of the combined valve in the fifth embodiment.

FIG. 21 is a sectional view of the combined valve 5 in a valve open state. FIG. 22 is a top view of the combined valve 5. FIG. 23 is an external view of an upper part of the combined valve 5.

As shown in FIG. 21, a body section of the combined valve 5 includes a valve body 611, cylinder 612, and housing 613. The combined valve 5 is also structured of a pilot valve and a manual valve. As for the combined valve 3, "Upper" indicates a manual valve side and "Lower" indicates a pilot valve side.

Firstly, the pilot valve of the combined valve 5 is explained. The pilot valve is further divided into a pilot mechanism and a valve operating mechanism. Here, the pilot mechanism includes the cylinder 612, the housing 613, a spring 622, and a piston 626.

The cylinder 612 and the housing 613 constitute an airtight container in which the piston 626 is slidably mounted. The spring 622 is located on the piston 626 to urge the housing 613 upwards and the piston 626 downwards.

The piston 626 partitions the space defined by the cylinder 612 and the housing 613 into two chambers, upper and lower. The lower chamber is a pressure chamber 623 which is communicated with an air supply port 659 mentioned later through an air supply passage 615 formed in the piston 626.

Figure 24A:
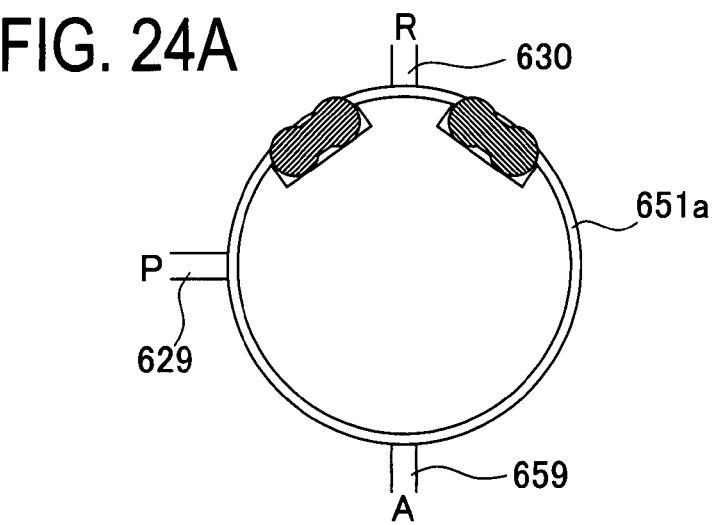
FIG. 24 is a sectional view of a rod taken along a line A-A.
Figure 24B:
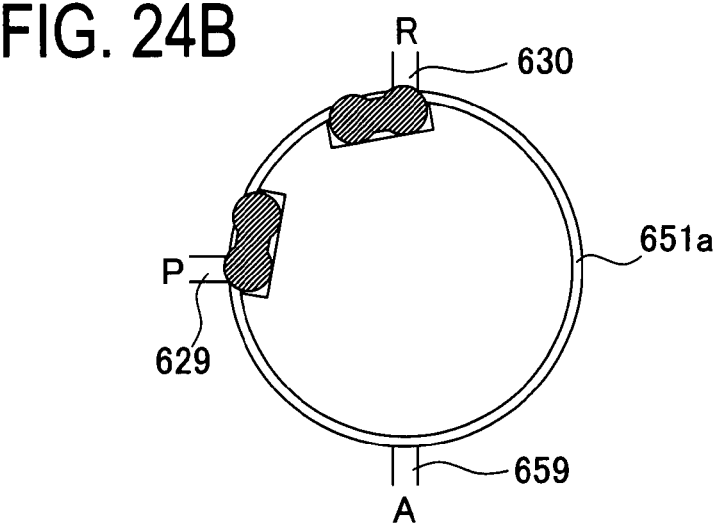
Figure 24C:
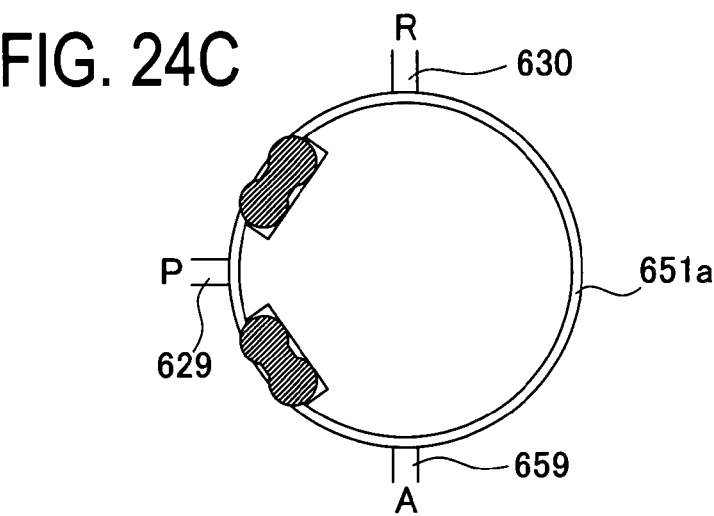

As shown in FIGS. 21 to 23, the housing 613 is formed with an operation port 629, exhaust port 630, and air supply port 659, which constitute a 3-port valve shown in FIGS. 24A to 24C in combination with a rod 651 mentioned later. FIGS. 24A to 24C are sectional views of a part of the combined valve 5 taken along a line A-A of FIG. 25. FIG. 24A shows the manual valve placed in a valve opening position; FIG. 24C shows the manual valve in a valve closed position; and FIG. 24B shows the manual valve in an intermediate position between those in FIGS. 24A and 24.

On the other hand, the valve operating mechanism includes the valve body 611, a diaphragm valve element 632, and ports 633 and 634. This structure is the same as in the combined valves 2 to 4 in the second to fourth embodiments and therefore the details thereof are not repeated here.

Figure 26A:
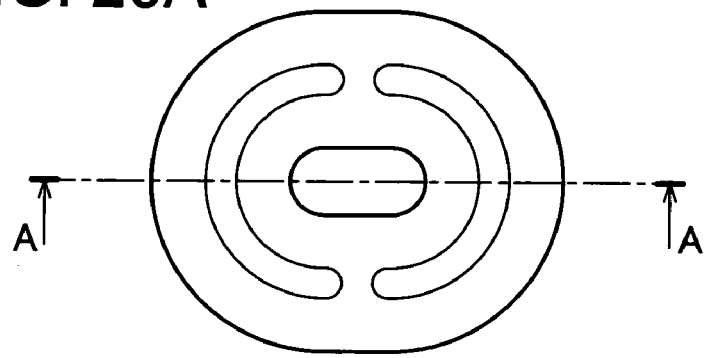
FIG. 26 is a view of a packing in the fifth embodiment.
Figure 26B:
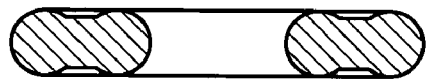

Next, the manual valve of the combined valve 5 is explained. The manual valve includes a rod 651, knob 653, gaskets 661, 662, and 663, and slide plate 665. The rod 651 is fit in a through hole 667 formed in the housing 613. The knob 653 is rotatably attached to one end of the rod 651. The knob 653 is provided with a handle 655. The rod 651 is formed with a pin 664 placed in a hole of the knob 653. The gasket 661 having the shape shown in FIG. 26 is located on the outer periphery of the rod 651 at its center area in an axial direction. The gaskets 662 and 663 are located surrounding the rod 651 at both sides of the gasket 61 in the axial direction. The slide plate 665 is placed above the rod 651. FIG. 26A is a top view of the gasket 661 and FIG. 26B is a sectional view of the gasket 661 taken along a line A-A of FIG. 26A.

The combined valve 5 having the above structure is operated as follows.

Figure 25:
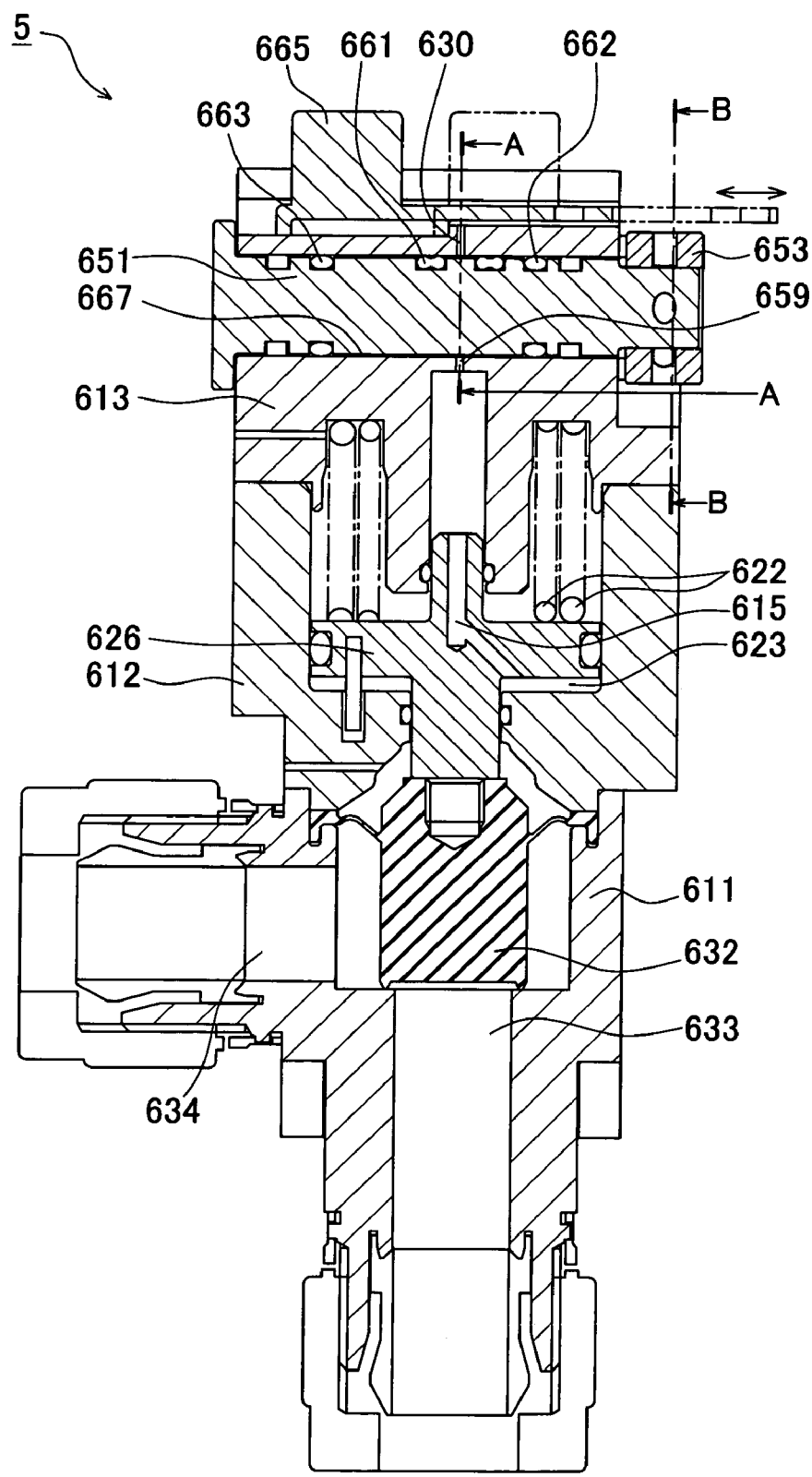
FIG. 25 is a sectional view of the combined valve in a valve closed state in the fifth embodiment.

A normal operation of the pilot valve will be described first. FIG. 21 shows the combined valve 5 with the manual valve held in the valve opening position and the pilot valve opened to allow the flow of fluid. FIG. 25 shows the combined valve 5 with the manual valve held in the valve opening position but the pilot valve closed to prevent the flow of fluid.

FIG. 21 is first explained. FIG. 21 shows the pilot valve opened by supply of air pressure thereto through an electromagnetic valve not shown. Specifically, when air is supplied to the pilot valve through the operation port 629, the air passes through the space formed between the outer periphery of the rod 651 and the through hole 667 and the air supply passage 659 and then the air is fed into the pressure chamber 623 through the air supply passage 615 in the piston 626. Accordingly, the air pressure in the pressure chamber 623 is increased. Under upward pressure in association with the increase in air pressure in the pressure chamber 623, the piston 626 is allowed to slide upwards in the cylinder 612 against the downward urging force of the spring 622. Then, the diaphragm valve element 632 integral with the piston 626 is not pressed downwards and is brought out of contact with the valve body 611. A passage space is accordingly generated between the diaphragm valve element 632 and the valve body 611, providing communication between the ports 633 and 634 through the communicating area 635. The fluid supplied into the valve body 611 through the port 633 is then discharged out through the port 634.

Next, FIG. 25 shows the pilot valve in the closed state. Specifically, air supply into the pressure chamber 623 through the operation port 629 is stopped and the air pressure forcing the piston 626 upwards is reduced. The subsequent operations are simply the reverse of the above mentioned operations and the details thereof are not repeated here.

Figure 27:
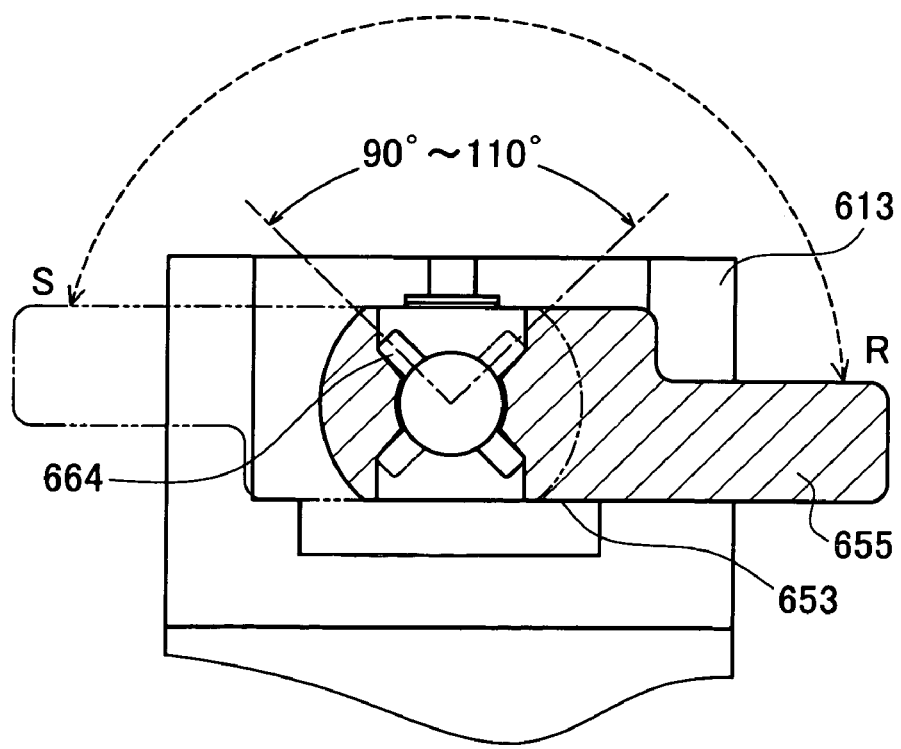
FIG. 27 is an external view of the knob part.
Figure 28A:
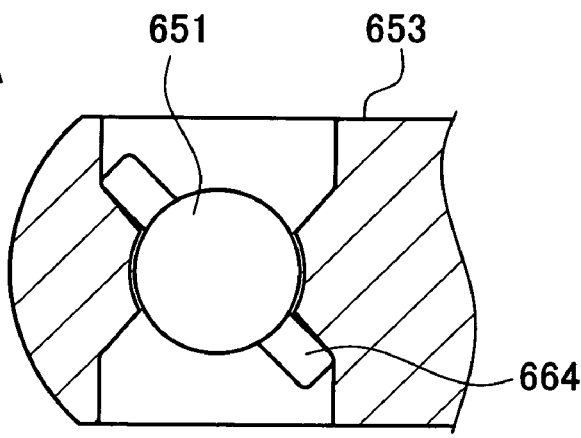
FIG. 28 is a view showing the relation between the knob, rod, and pin.
Figure 28B:
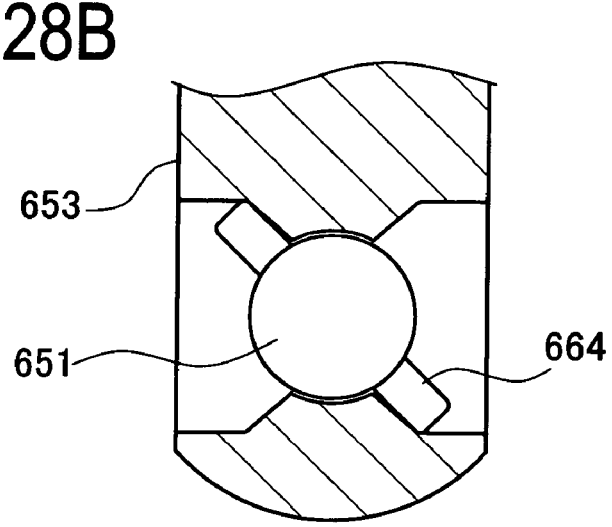
Figure 28C:
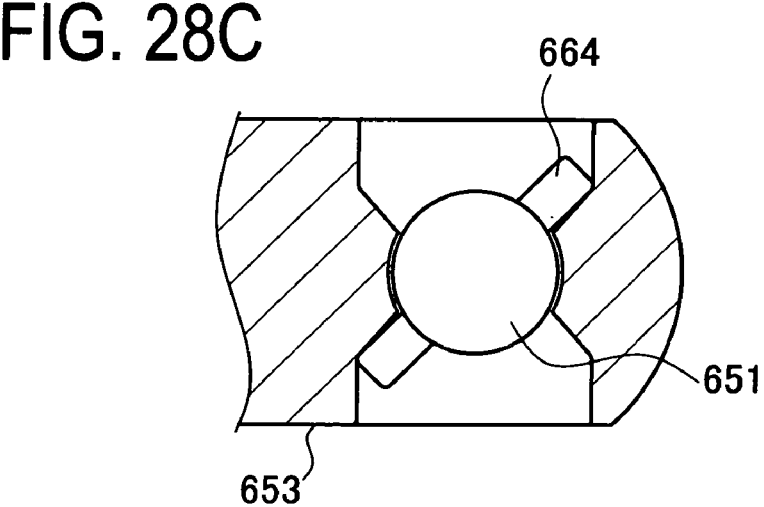

Next, an operation of the manual valve when used by an operator for example as a safety mechanism during maintenance or the like is explained referring to FIGS. 27 and 28. FIG. 27 is a sectional view of the knob 653 taken along a line B-B of FIG. 25. FIGS. 28A to 28C are explanatory views showing a relation between the knob 653, rod 651, and pin 664.

Explanation is made on the manual valve switched from the valve opening position to the valve closing position. To be concrete, the operator rotates the handle 655 of the knob 653 couterclockwise in front view in FIG. 27 from the valve opening position (hereinafter, referred to as a safety mechanism release position R) to a predetermined position (hereinafter, referred to as a safety mechanism set position S). When the handle 655 is rotated by a predetermined angle from a state of FIG. 28A to a different state of FIG. 28B, the rotation of the knob 653 is transmitted to the rod 651 through the pin 664, causing the rod 651 to rotate. When the handle 655 has completely been rotated to the safety mechanism set position S, the knob 653 is positioned as shown in FIG. 28C.

The knob 653 is provided as shown in FIG. 28 with a predetermined amount of play to provide a delay until the rotating of the knob 653 is transmitted to the rod 651 through the pin 664. In other words, backlash is provided for the rotating amount of the rod 651 with respect to the rotating amount of the knob 653. The rotating amount with backlash is set in a range from 90 degrees to 110 degrees. Accordingly, the rotating amount of the knob 653 is 180 degrees, whereas the actual rotating amount of the rod 651 is in a range from 70 degrees to 90 degrees.

When the manual valve is rotated to the safety mechanism set position S, the communication between the operation port 629 and the air supply port 659 is interrupted with the gasket 661, while the exhaust port 630 is communicated with the air supply port 659 and hence with the pressure chamber 623. Accordingly, air is exhausted through the exhaust port 630, reducing the air pressure in the pressure chamber 623. The piston 626 is slid downwards by the urging force of the spring 622. The diaphragm valve element 632 coupled to the piston 626 is also then moved downwards into contact with the valve body 611, bringing the combined valve 5 to the valve closed state.

Further, the slide plate 665 is slid from the above position toward the knob 653 until an end of the slide plate 665 protrudes as shown in FIGS. 21 and 23. A padlock 657 for example is inserted and locked in a key hole 665a formed in the end of the slide plate 665. In this state, the knob 653 is prevented from rotating and therefore the combined valve 5 can be held in the valve closed state.

The slide plate 665 may be slid by;

(1) Pushing a lug 665b of the slide plate 665 with fingers; or (2) Utilizing a return spring placed between the slide plate 665 and the housing 613 for automatic sliding.

To be concrete, the above manner (2) that utilizes the return spring for automatic sliding may include the following techniques A and B.

Figure 29A:
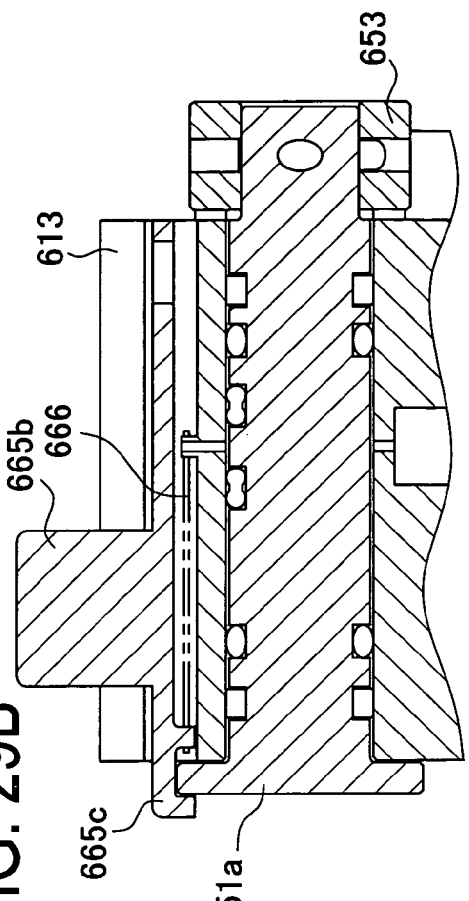
FIG. 29 is a general view showing a technique to automatically slide by use of a return spring.
Figure 29B:
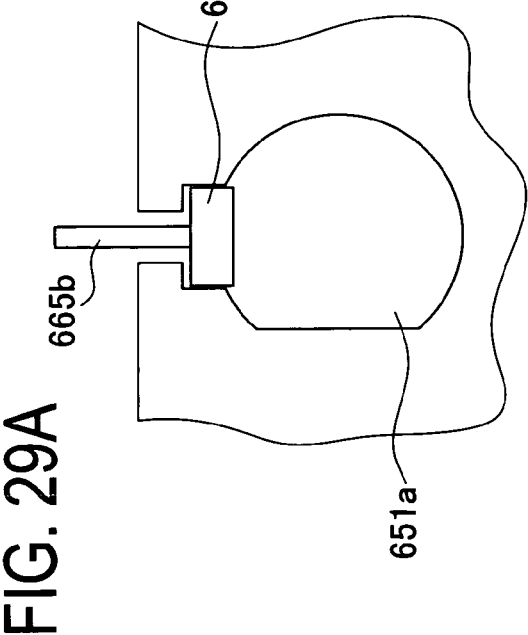
Figure 29C:
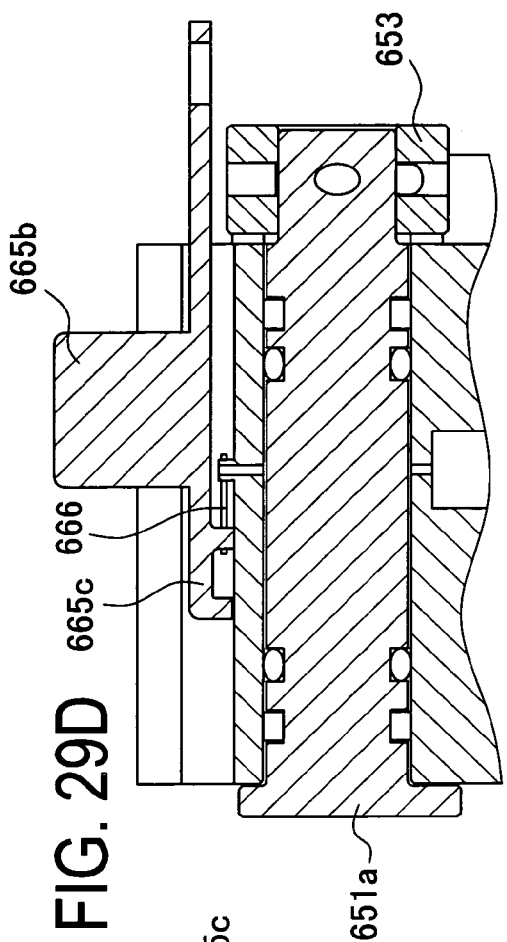
Figure 29D:
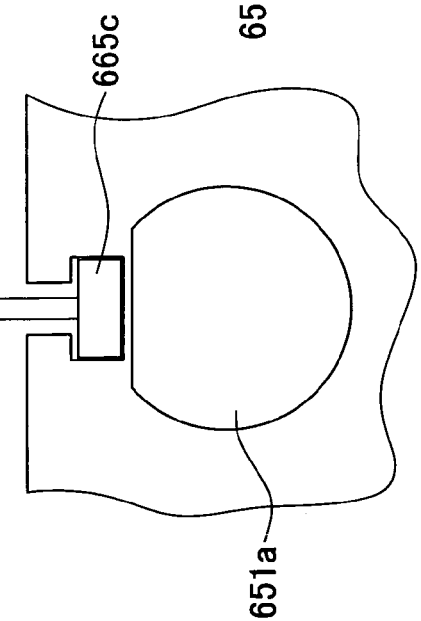

FIGS. 29A to 29D are schematic views of the manual valve to explain the technique A; specifically, FIG. 29A is a side view of the manual valve in the valve opening position, FIG. 29B is a sectional view of the same, FIG. 29C is a side view of the manual valve in the valve closing position, and FIG. 29D is a sectional view of the same.

In the technique A, the slide plate 665 is provided with the lug 665b and a hook 665c as shown FIGS. 29A to 29D, and a return spring 666 is located between the slide plate 665 and the housing 613. While the manual valve is in the valve opening position, the hook 665c is engaged with a flange 651a of the rod 651 as shown in FIGS. 29A and 29B, thereby holding the slide plate 665 against sliding. In this state, tension is exerted on the return spring 666.

The flange 651a of the rod 651 includes a notch formed along the periphery thereof. When the knob 653 is rotated to bring the manual valve to the valve closing position, the notch will be adjusted to face to the hook 665c of the slide plate 665 as shown in FIGS. 29C and 29D. The hook 665c of the slide plate 665 is then disengaged from the flange 651a of the rod 651. Accordingly, the tension exerted on the return spring 666 is eliminated, allowing automatic sliding the slide plate 665.

Figure 30A:
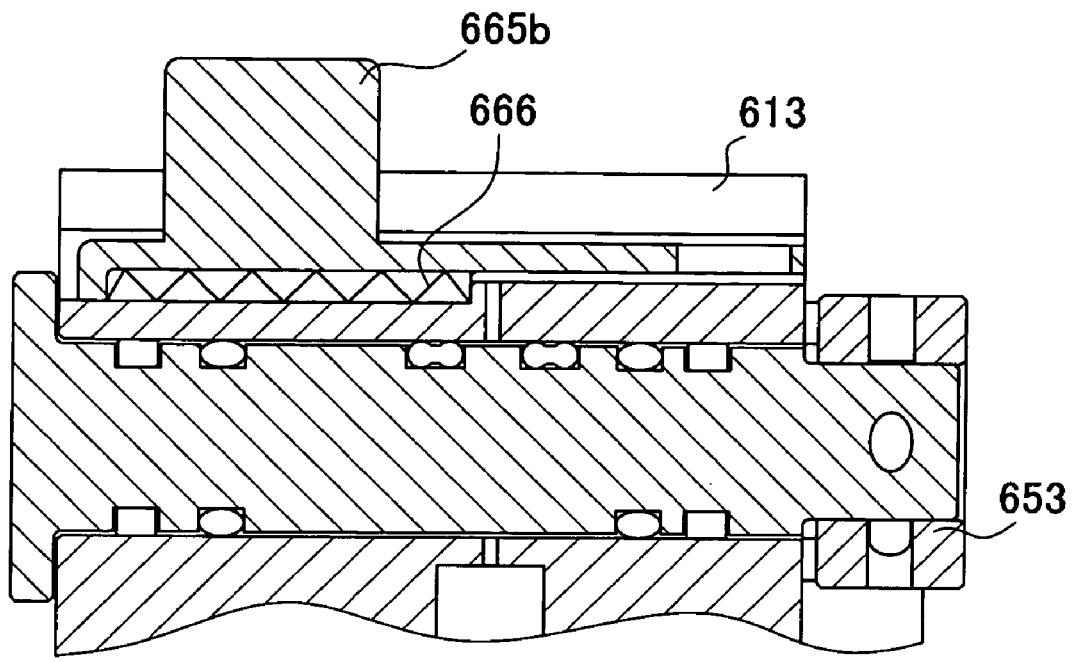
FIG. 30 is a general view showing another technique to automatically slide by use of a return spring.
Figure 30B:
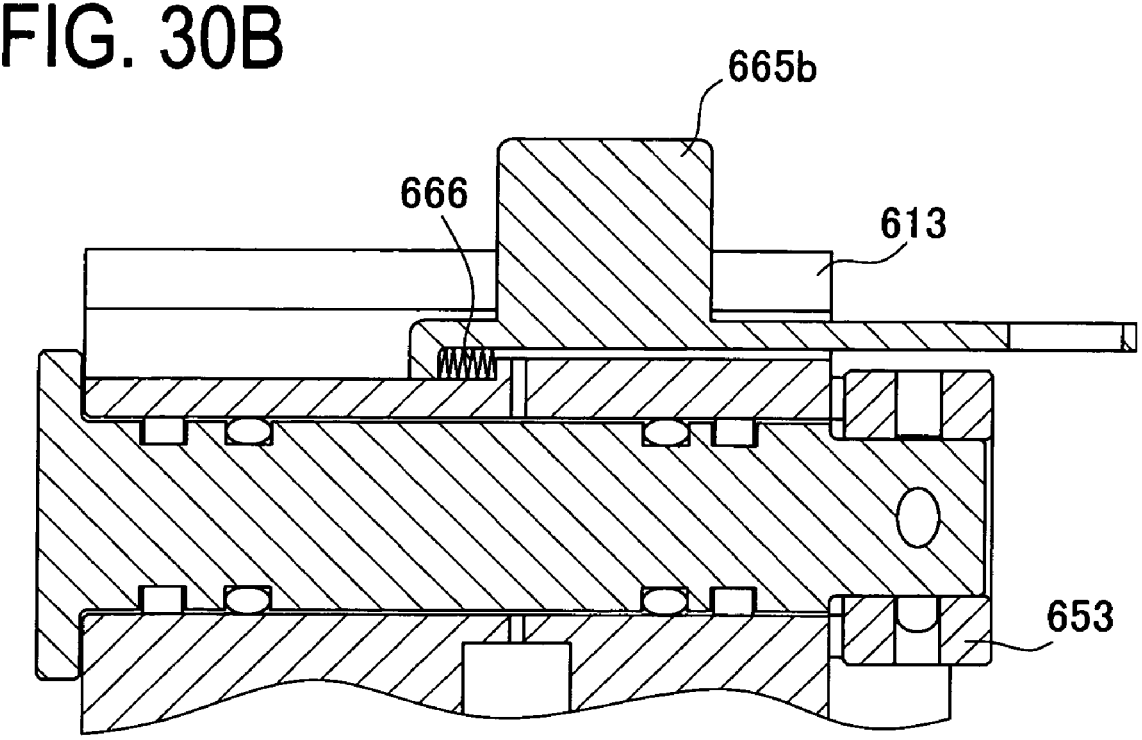

FIGS. 30A and 30B are schematic views of the manual valve to explain the technique B; specifically, FIG. 30A is a sectional view of the manual valve in the valve opening position and FIG. 30B is a sectional view of the same in the valve closing position.

In the technique B, the slide plate 665 is similarly provided with the lug 665b and a return spring 666 is located between the slide plate 665 and the housing 613. This technique B adopts the reverse operation of the return spring 666 to that in the technique A. To be concrete, while the lug 665b of the slide plate 665 is not pressed with fingers, the return spring 666 is held in a natural length, generating no spring force. The slide plate 665 is therefore held in a non-sliding state. To slide the slide plate 665, the lug 665b is pushed with fingers, thereby compressing the return spring 666.

Figure 31:
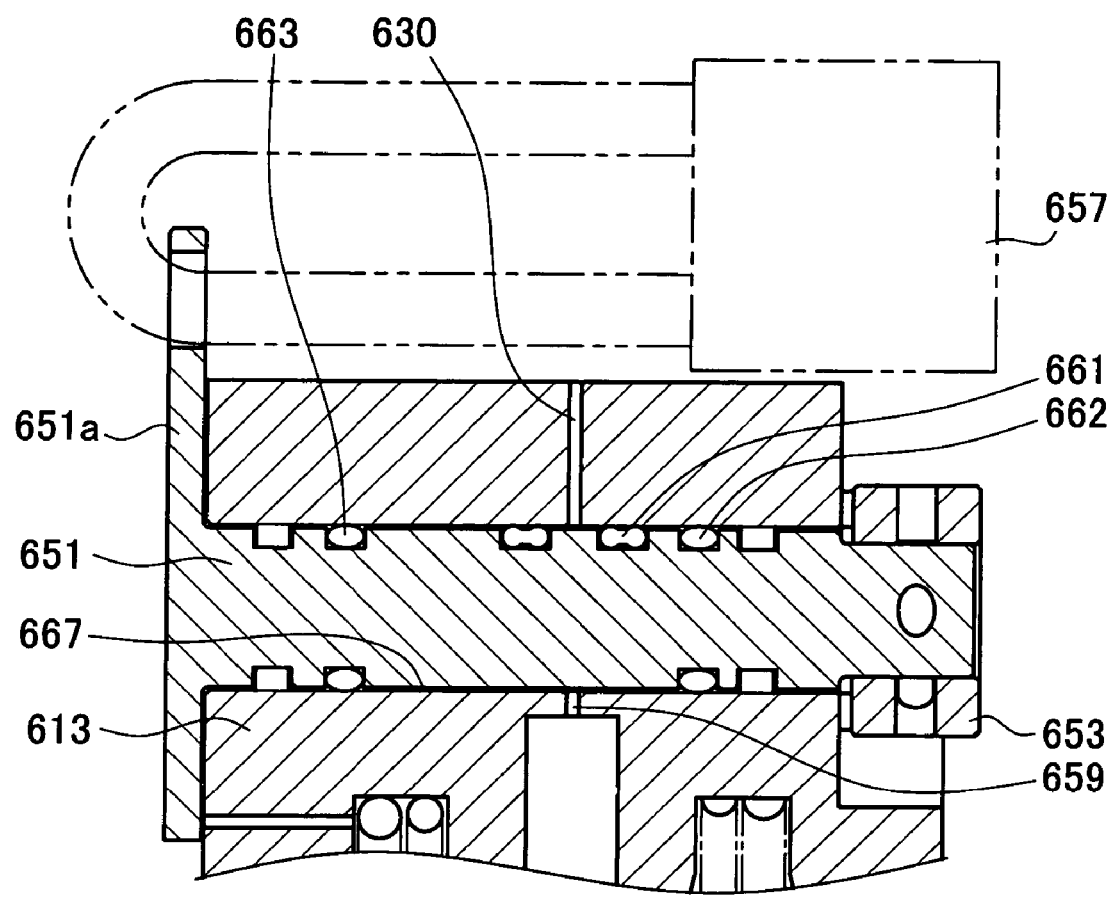
FIG. 31 is a view showing another form of locking.
Figure 32:
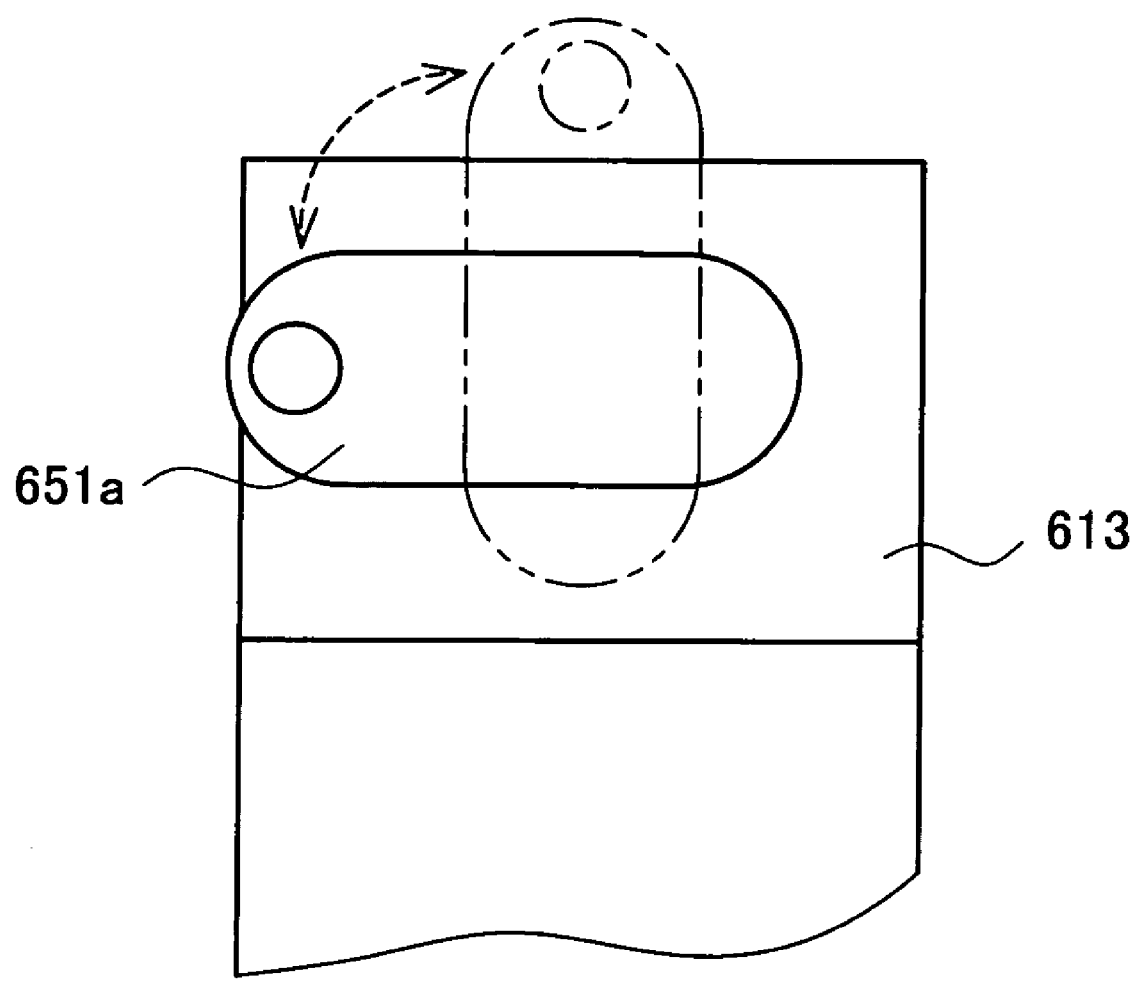
FIG. 32 is a view showing the shape of an end of a rod opposite to an end having the knob.

Another configuration using a padlock 657 may be adopted as shown in FIGS. 31 and 32. In this combined valve 5, the rod 651 is provided with a flange 651a at an end opposite to the knob 653 side. This flange 651a has a shape shown in FIG. 32. In particular, the flange 651a is oriented as shown by a solid line in FIG. 32 when the manual valve is in the valve opening position. On the other hand, the flange 651a is oriented as shown by a double-dashed line in FIG. 32 when the manual valve is in the valve closing position. When the manual valve is in the valve closing position, accordingly, the keyhole 651b is placed vertically above the housing 613. In this position, the padlock 657 or the like is engaged for locking.

In the above operation, only the rod 651 is moved by the knob 653 and the piston 626 is not pressed. Accordingly, the piston 626 receives no force resulting from the rotation of the knob 653, and the valve body 611 receives only the urging force of the spring 622 through the diaphragm valve element 632. No creep will therefore be caused, so that the sealing strength of the valve operating mechanism can continuously be ensured.

Further, when the handle 655 of the knob 653 in FIG. 21 is rotated from the safety mechanism release position R to the safety mechanism set position S, as the rotation of the handle 655 is started, the communication between the air supply passage 659 and the operation port 629 is interrupted by the gasket 661 of the rod 651 even when air is supplied to the operation port 629 by an electromagnetic valve not shown. Consequently, no air is supplied through the operation port 629 and the handle 655 of the knob 653 is thus allowed to be rotated under no air pressure thereon.

The above structure enables the operator to readily rotate the manual valve to the valve closing position without applying a large force to the manual valve.

In the combined valve 5, moreover, the rod 651 is placed in a lateral direction perpendicular to a vertical (height) direction of the combined valve 5 and also the knob 653 is provided on the side of the combined valve 5. Accordingly, the combined valve 5 is shorter in height than the combined valves 1 to 4 in the first to fourth embodiment where the valve mechanisms are arranged vertically and coaxially.

According to the above embodiments of the present invention, the above combined valves include a mechanism for preventing or covering a decrease in sealing strength of the valve operating function due to creep phenomenon which may occur in the valve seats. If the valve seats are made of fluorocarbon resin having resistance to corrosion, therefore, those combined valves may also be applied to a chemical liquid valve used in a semiconductor manufacturing process.

What is claimed is:

1. A combined valve comprising:
 a valve mechanism including a diaphragm valve element and a valve seat with which the diaphragm valve element is brought into and out of contact to control a flow of fluid;
 a pilot mechanism including an urging device that presses the diaphragm valve element against the valve seat, the pilot mechanism being operated to bring the diaphragm valve element out of contact with the valve seat by air pressure; and a manual mechanism arranged to act on operations of the pilot mechanism, wherein when the manual mechanism is operated to interrupt a supply passage of air to the pilot valve, the diaphragm valve element is axially moved from a valve open position to a valve closed position by means of the urging device; and wherein the combined valve further comprises a manual-mechanism holding device for holding the manual mechanism in a predetermined position to hold the diaphragm valve element in the valve closed position;

wherein the manual mechanism includes a rod formed with a flow passage in an outer periphery, the manual mechanism being arranged to interrupt the supply passage of air to the pilot valve by rotating the rod by a predetermined angle; and wherein the manual valve holding device holds the rod at the predetermined angle to hold the diaphragm valve element in the valve closed position.

2. The combined valve according to claim 1, wherein the manual mechanism further includes a knob for rotating the rod, and the manual-mechanism holding device includes a slide plate which is moved to a predetermined position to hold the knob in a predetermined position.

3. The combined valve according to claim 2, further comprising a locking device for locking the slide plate in the predetermined position.

4. The combined valve according to claim 2, wherein the slide plate is urged in an opposite direction to a direction of holding the knob in the predetermined position.

5. The combined valve according to claim 1, wherein the manual-mechanism holding device comprises a locking device for locking the rod at the predetermined angle.

6. A combined valve comprising:

a valve mechanism including a diaphragm valve element and a valve seat with which the diaphragm valve element is brought into and out of contact to control a flow of fluid;

a pilot mechanism including an urging device that presses the diaphragm valve element against the valve seat, the pilot mechanism being operated to bring the diaphragm valve element out of contact with the valve seat by air pressure; and a manual mechanism arranged to act on operations of the pilot mechanism;

wherein when the manual mechanism is operated to interrupt a supply passage of air to the pilot valve, the diaphragm valve element is axially moved from a valve open position to a valve closed position by means of the urging device, and the combined valve further comprises a manual-mechanism holding device for holding the manual mechanism in a predetermined position to hold the diaphragm valve element in the valve closed position, wherein the manual mechanism includes a piston-shaped portion internally formed with an air supply passage, a spool cylinder in which the piston-shaped portion is slidingly placed, and an interrupting mechanism for interrupting communication between the air supply passage of the piston-shaped portion and a supply passage of the spool cylinder.

7. The combined valve according to claim 6, further comprising a cover formed with an air supply port, and wherein the manual mechanism includes an operation port to which air is supplied and an interrupting mechanism for allowing and interrupting communication between the operation port and the air supply port of the cover.

8. The combined valve according to claim 7, wherein the cover includes a 3-port valve formed with an operation port, an exhaust port, and the air supply port.

* * * * *